United States Patent
Mizuki et al.

(10) Patent No.: US 9,834,670 B2
(45) Date of Patent: Dec. 5, 2017

(54) EPOXY RESIN COMPOSITION FOR FIBER-REINFORCED COMPOSITE MATERIAL, PREPREG, AND FIBER-REINFORCED COMPOSITE MATERIAL

(75) Inventors: Maki Mizuki, Nagoya (JP); Yuko Goto, Nagoya (JP); Nobuyuki Tomioka, Nagoya (JP); Hiroaki Sakata, Ehime (JP); Hiroshi Taiko, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 557 days.

(21) Appl. No.: 13/823,905

(22) PCT Filed: Sep. 22, 2011

(86) PCT No.: PCT/JP2011/071610
§ 371 (c)(1),
(2), (4) Date: Apr. 19, 2013

(87) PCT Pub. No.: WO2012/039456
PCT Pub. Date: Mar. 29, 2012

(65) Prior Publication Data
US 2013/0202873 A1  Aug. 8, 2013

(30) Foreign Application Priority Data

Sep. 24, 2010 (JP) .................................. 2010-213120
Feb. 25, 2011 (JP) .................................. 2011-039577

(51) Int. Cl.
*B32B 27/38* (2006.01)
*B32B 27/04* (2006.01)
*B32B 27/18* (2006.01)
*B32B 27/26* (2006.01)
*C08L 63/00* (2006.01)
*C08G 59/28* (2006.01)
*C08G 59/38* (2006.01)
*C08G 59/50* (2006.01)
*C08G 59/42* (2006.01)
*C08J 5/24* (2006.01)

(52) U.S. Cl.
CPC .............. *C08L 63/00* (2013.01); *C08G 59/28* (2013.01); *C08G 59/38* (2013.01); *C08G 59/4246* (2013.01); *C08G 59/504* (2013.01); *C08G 59/5033* (2013.01); *C08J 5/24* (2013.01); *C08G 2261/126* (2013.01); *C08J 2363/00* (2013.01); *C08J 2433/08* (2013.01); *Y10T 428/249942* (2015.04); *Y10T 428/249945* (2015.04)

(58) Field of Classification Search
None
See application file for complete search history.

(56) References Cited

U.S. PATENT DOCUMENTS 6,894,113 B2 * 5/2005 Court ..................... C08L 53/00
                                                           525/187
2008/0051511 A1   2/2008 Guerret et al.
2008/0108761 A1   5/2008 Kouchi et al.
(Continued)

FOREIGN PATENT DOCUMENTS

JP    2002-265565 A    9/2002
JP    2008-528718 A    7/2008
(Continued)

OTHER PUBLICATIONS

Derwent accession No. 2010-D79876 for Japanese Patent No. 2010-100834, PCT WO 2010/035859 and U.S. 2011/0184091, Mizuki et al., Apr. 1, 2010, three pages.*
(Continued)

*Primary Examiner* — Michael J Feely
(74) *Attorney, Agent, or Firm* — Birch, Stewart, Kolasch & Birch, LLP

(57) ABSTRACT

Provided are a fiber-reinforced composite material excellent in heat resistance and strength properties, an epoxy resin composition to obtain the fiber-reinforced composite material, and a prepreg obtained by using the epoxy resin composition. Further provided are a fiber-reinforced composite material having less volatile matters during the curing time, and having excellent heat resistance and strength properties, an epoxy resin composition to obtain the fiber-reinforced composite material, and a prepreg obtained by using the epoxy resin composition. Provided are: an epoxy resin composition for a fiber-reinforced composite material, comprising an amine type epoxy resin [A], an aromatic amine curing agent [B], and a block copolymer [C] having a reactive group capable of reacting with an epoxy resin; a prepreg obtained by impregnating a reinforced fiber with the epoxy resin composition; and a fiber-reinforced composite material obtained by curing the prepreg. Further provided are: an epoxy resin composition comprising an epoxy resin [A] having two or more of four- or more-membered ring structures, and having either one of a glycidyl amino group directly bonded to the ring structure or a glycidyl ether group directly bonded to the ring structure, epoxy resin [B] having three or more of functional groups, a curing agent [C], and an elastomer component [D]; a prepreg obtained by impregnating a reinforced fiber with the epoxy resin composition; and a fiber-reinforced composite material obtained by curing the prepreg.

12 Claims, No Drawings

(56) References Cited

U.S. PATENT DOCUMENTS

| | | | |
|---|---|---|---|
| 2010/0209642 A1* | 8/2010 | Tomioka | B32B 27/38 428/36.9 |
| 2011/0184091 A1* | 7/2011 | Mizuki et al. | 523/428 |
| 2013/0281573 A1* | 10/2013 | Goto | C08J 5/24 523/436 |
| 2014/0309337 A1* | 10/2014 | Nagano | C08J 5/24 523/428 |

FOREIGN PATENT DOCUMENTS

| | | | | |
|---|---|---|---|---|
| JP | 2010-100834 A | 5/2010 | | |
| WO | WO 03/040206 A1 | 5/2003 | | |
| WO | WO 2008/143044 A1 * | 11/2008 | | B32B 27/38 |
| WO | WO 2008/143044 A1 | 11/2008 | | |
| WO | WO 2010/035859 A1 * | 4/2010 | | |

OTHER PUBLICATIONS

International Search Report for PCT/JP2011/071610 dated Dec. 27, 2011.

* cited by examiner

EPOXY RESIN COMPOSITION FOR FIBER-REINFORCED COMPOSITE MATERIAL, PREPREG, AND FIBER-REINFORCED COMPOSITE MATERIAL

TECHNICAL FIELD

The present invention relates to fiber-reinforced composite materials suitable for aerospace applications, prepregs from which to produce such materials, and epoxy resin compositions for fiber-reinforced composite materials, which are advantageously used as matrix resins for prepregs (hereinafter also referred to simply as "epoxy resin compositions").

In recent years, fiber-reinforced composite materials based on reinforcement fibers, such as carbon fiber and aramid fiber, have been used for diverse applications to take advantage of their high specific strength and specific modulus of elasticity. Examples include structural material applications (e.g. aircraft and motor vehicles), sports applications (e.g. tennis rackets, golf shafts and fishing rods), and general industrial applications.

Typical methods to manufacture such fiber-reinforced composite materials include the prepreg-based method, which involves the curing of prepregs, each sheet-like intermediate material obtained by impregnating reinforcement fibers with an uncured matrix resin, and the resin transfer molding method, which involves the injection of a liquid resin into reinforcement fibers arranged inside a mold and curing of it. In the prepreg-based method, two or more laminated prepregs are usually cured into a fiber-reinforced composite material through the application of heat and pressure. As such prepreg matrix resins, thermosetting resins, particularly epoxy resins, are often used from the viewpoint of processability and other productivity requirements.

Of all applications, structural materials for aircraft, motor vehicles, and the like are subject to particularly stringent lightweight and high mechanical strength requirements, and this has led to the use of fiber-reinforced composite materials based on reinforcement fibers with a high modulus of elasticity. However, increasing the modulus of elasticity of reinforcement fibers tends to reduce other characteristics, such as fiber-direction compressive strength and impact resistance.

In this regard, patent document 1 claims that the use of an amine-type epoxy resin component as matrix resin is an effective way of improving fiber-direction compressive strength and other strength characteristics. However, this method has a problem in that it can hardly improve impact resistance.

To increase the impact resistance of a fiber-reinforced composite material, it is necessary to improve the extensibility of the reinforcement fibers and the extensibility and toughness of the matrix resin as components of the fiber-reinforced composite material. Of these two, the improvement of the toughness of the matrix resin has been recognized as particularly important and effective, and this has led to various attempts to modify epoxy resins.

Conventional methods to improve the toughness of epoxy resins, such as the blending of a rubber or a thermosetting resin with excellent toughness, have a problem in that they are associated with a reduction in processability due to reduced heat resistance or increased viscosity and a reduction in quality due to the formation of voids and the like.

In recent years, the blending of block copolymers, such as a styrene-butadiene-methyl methacrylate copolymer and a butadiene-methyl methacrylate block copolymer, has been proposed as a method to ensure the stable formation of a fine phase separation structure during the epoxy resin curing process and thus dramatically improve the toughness of epoxy resins. However, there is a problem with amine type and other epoxy resins employed in fiber-reinforced composite materials subject to high heat resistance requirements, such as aircraft-use materials, in that they give rise to fragile cured materials due to their low compatibility with block copolymers.

As a solution to the problem, patent document 2 proposes the blending of a methyl methacrylate-butyl acrylate block copolymer based on a random copolymerization of highly polar groups into the amine-type epoxy resin, claiming that it can generate impact resistance while retaining the compressive strength characteristics. Patent document 3, on the other hand, proposes the blending of a block copolymer into a base epoxy resin containing an amine-type epoxy resin and an epoxy resin with a rigid backbone in a specific ratio as a technique to improve impact resistance while minimizing the decrease in heat resistance and modulus of elasticity. However, these techniques have a problem in that an increase in the amount of the amine-type epoxy resin contained leads to a deterioration in mechanical characteristics due to the formation of a coarse phase separation structure by the block copolymer. They also sometimes lead to other problems, such as the poor reinforcement fiber impregnability of the base epoxy resin component due to high viscosity and variability in characteristics in large structural member applications, such as an aircraft main wing structure and windmill blade, due to a variation in morphology as a result of an uneven temperature distribution inside the furnace or change in the thermal history of the material along the thickness direction.

On the other hand, block copolymers themselves have steadily been improved, with block copolymers that introduce reactive monomers as copolymerization components developed. For instance, patent document 4 discloses that the blending of a methyl methacrylate-butyl methacrylate block copolymer that has introduced an acidic functional group as a copolymerization component makes it possible to control water solubility with polymers. However, since no attention has been paid to the compatibility between such a block copolymer and an epoxy resin, virtually nothing is known about the physical characteristics of the composition obtained through their use.

Meanwhile, resin compositions with a high glass transition temperature Tg generally have a high curing temperature, and such resin compositions tend to contain large amounts of matter that becomes volatile during the curing or molding time, when they are exposed to high temperatures. In the case of a honeycomb material, for instance, the presence of large amounts of matter that becomes volatile during the curing time leads to the trapping of vaporized volatile matter inside honeycomb cells during the formation of the surface, and such components become an obstacle to the bonding between the surface material and the honeycomb core material by expanding inside the closed spaces of honeycomb cells. Also, with the autoclave molding of a prepreg laminate, volatile matter sometimes causes the formation of voids during molding, thus reducing the strength of the fiber-reinforced composite material as the end product.

To produce highly heat-resistant epoxy resin compositions with relatively small amounts of volatile matter, a technique based on combining a polyfunctional epoxy resin with polyisocyanate, etc. has been proposed (see patent document 5), but this proposal does not touch on the strength of fiber composite materials produced through the curing of prepreg laminates.

To increase the strength of a fiber-reinforced composite material, it is necessary to increase the strength and volume fraction of reinforcement fibers (high Vf). Although a method to obtain high strength reinforcement fibers has been proposed (see patent document 6), this proposal does not touch on the strength exhibited when they become part of a fiber-reinforced composite material. As a general tendency, the stronger a reinforcement fiber is made, the more difficult it becomes to make practical use of this strength. For instance, even if the strand strength of a reinforcement fiber improves, it is not possible to take full advantage of it, as the fiber tensile strength utilization rate (Tensile strength of fiber-reinforced composite material/(Strand strength of reinforcement fiber×Volume fiber content)×100) tends to decrease. For this reason, even if such a high-strength carbon fiber can be obtained, fully utilizing its strength in terms of the strength of a fiber-reinforced composite material still requires the overcoming of further technical hurdles.

It is known that the tensile strength utilization rate for the same reinforcement fiber varies widely according to the matrix resin to combine it with, its molding conditions, and the like. In particular, curing temperatures of 180° C. or more pose a problem in that the heat stress generated in the fiber-reinforced composite material prevents the strength of the reinforcement fiber from fully manifesting. For this reason, research has been underway into the modification of matrix resins to obtain adequate tensile strength even at a curing temperature of 180° C.

It is known that increasing the tensile fracture elongation of a matrix resin leads to an improvement in the fiber tensile strength utilization rate of a fiber-reinforced composite material. To improve the tensile fracture elongation of a matrix resin, it is effective to lower its crosslink density, but lowering crosslink density sometimes leads to a reduction in the heat resistance of the fiber-reinforced composite material, thus giving rise to the problem of limited effective blending choices. To solve this problem, it has been proposed to ensure that tensile fracture elongation and open-mode toughness (KIc) satisfy a specific relationship as a means to obtain a high tensile strength utilization rate (see patent document 7). However, blending large amounts of a thermoplastic resin or rubber component into a matrix resin to improve open-mode toughness (KIc) usually results in a rise in viscosity, and this sometimes reduces processability or ease of handling during the prepreg manufacturing process.

Other developments in recent years include an expansion of the applicable range of fiber-reinforced composite materials as aircraft structural materials, progress in the application of fiber-reinforced composite materials to windmill blades and various turbines aimed at improving power generation efficiency and energy conversion efficiency, and ongoing research into their application to thick structural materials comprising a large number of laminated prepregs and structural materials with three-dimensionally curved shapes. The imposition of tensile or compressive stress on such a thick or curved structural member sometimes results in its all-out destruction due to the generation of outward prepreg interlaminar peeling stress, appearance of interlaminar cracks, and reduction in the strength and rigidity of the member as a whole due to the growth of those cracks. This gives rise to a need for the kind of toughness to counter this stress, namely interlaminar toughness in the peeling stress mode (mode I).

In this regard, a technique to increase the toughness of a structural material and limit the damage caused by weight-drop impacts on its surface by deploying high-toughness particles based on polyamide, etc. in the interlaminar region has been proposed (see patent document 8). However, this technique, though capable of increasing interlaminar toughness in the shear stress mode, namely mode II or III, has been found to have no specific effect on mode-I interlaminar toughness.

Furthermore, a technique to improve composite-level mode-I interlaminar toughness while minimizing the reduction in heat resistance and the modulus of elasticity by using a base resin blended with an amine type epoxy with a rigid backbone in a specific ratio as a means to disperse a block copolymer containing an elastomer structure on a nano scale and introduce a fine elastomer dispersed phase into the epoxy resin has been proposed (see patent document 3). However, this technique uses base epoxy components with a high average molecular weight, rendering the reinforcement fiber impregnability of the resin low due to its high viscosity, a problem encountered from time to time in applications involving large structural materials, such as an aircraft main wing structure and windmill blade. It is also incapable of exhibiting sufficient tensile strength in low temperature environments.

As can be seen from the above, an epoxy resin composition that turns into low-viscosity high-quality molded materials with only small amounts of matter that becomes volatile during the curing time and provides carbon fiber-reinforced composite materials that can advantageously be used as thick and curved structural materials because of their excellent heat resistance, outstanding mechanical strength, even in low-temperature and other tough use environments, and high mode-I interlaminar toughness by solving all the problems raised above, does not yet exist.

PRIOR ART DOCUMENTS

Patent Documents

Patent document 1: Japanese Published Unexamined Application (Tokkai) No. SHO 62-1717, Official Gazette
Patent document 2: International Publication No. WO 2008/143044, Pamphlet
Patent document 3: International Publication No. WO 2010/035859, Pamphlet
Patent document 4: Published Japanese Translation of PCT International Publication (Tokuhyo) No. 2009-538384, Official Gazette
Patent document 5: Japanese Published Unexamined Application (Tokkai) No. 2001-31838, Official Gazette
Patent document 6: Japanese Published Unexamined Application (Tokkai) No. HEI-11-241230, Official Gazette
Patent document 7: Japanese Published Unexamined Application (Tokkai) No. HEI-9-235397, Official Gazette
Patent document 8: Japanese Published Unexamined Application (Tokkai) No. SHO-63-162732, Official Gazette

SUMMARY OF THE INVENTION

Problems to be Solved by the Invention

The present invention aims to provide epoxy resin compositions that turn into low-viscosity and high-quality molded materials exhibiting only a small variation in morphology as molding conditions change and provide cured materials with excellent heat resistance and strength characteristics, as well as prepregs and fiber-reinforced composite materials based on them.

It also aims to provide epoxy resin compositions which turn into low-viscosity and high-quality molded materials with only small amounts of matter that becomes volatile during the curing time and provide carbon fiber-reinforced composite materials that can advantageously be used as thick and curved structural materials because of their excellent heat resistance, outstanding mechanical strength, even in low-temperature and other tough use environments, and high mode-I interlaminar toughness, as well as prepregs and carbon fiber-reinforced composite materials based on them.

Means of Solving the Problems

The first preferred embodiment of the present invention has any of the constitutions described below to fulfill the aims—namely, any epoxy resin composition for fiber-reinforced composite materials having at least all of components [A], [B] and [C] listed below and characterized by the fact that it contains 70 to 100 parts by weight of [A] and 2 to 15 parts by weight of [C] for 100 parts by weight of total epoxy resin content.
[A]: An amine-type epoxy resin
[B]: An aromatic amine curing agent
[C]: A block copolymer having a reactive group capable of reacting with an epoxy resin.

According to a preferred embodiment of the present invention, the amine-type epoxy resin [A] of the epoxy resin composition contains a polyfunctional epoxy resin and a difunctional epoxy resin, and, according to a more preferred embodiment, 30 to 70 parts by weight of a polyfunctional epoxy resin and 20 to 50 parts by weight of a difunctional epoxy resin are blended in for 100 parts by weight of total epoxy resin content in the epoxy resin composition.

According to a preferred embodiment of the present invention, the aromatic amine curing agent [B] of the epoxy resin composition is diaminodiphenyl sulfone or its derivative or isomer.

According to a preferred embodiment of the present invention, the block copolymer [C] of the epoxy resin composition having a reactive group capable of reacting with an epoxy resin has a carboxyl group as such a reactive group.

The present invention encompasses any hardened resin obtained by curing the epoxy resin composition, any prepreg obtained by impregnating reinforcement fibers with the epoxy resin composition, any fiber-reinforced composite material obtained by curing such a prepreg, and any fiber-reinforced composite material comprising the hardened resin and reinforcement fibers.

The second preferred embodiment of the present invention has any of the constitutions described below to fulfill the aims—namely, any epoxy resin composition for carbon fiber-reinforced composite materials containing at least all of components [A'], [B'], [C'] and [D'] listed below and characterized by the fact that it contains 10 to 60 mass % of [A] and 40 to 80 mass % of [B'] for 100 mass % of total epoxy resin content.
[A']: An epoxy resin having two or more ring structures based on 4 or more-membered rings and either a glycidyl amino group or glycidyl ether group directly bonded to a ring structure
[B']: An at least trifunctional epoxy resin
[C']: A curing agent
[D']: An elastomer component The present invention encompasses a hardened resin obtained by curing the epoxy resin composition, a carbon fiber-reinforced composite material containing carbon fibers, a prepreg obtained by impregnating carbon fibers with the epoxy resin composition, and a fiber-reinforced composite material obtained by curing such a prepreg.

According to a preferred embodiment of the present invention, the epoxy resin [A] of the epoxy resin composition is a difunctional epoxy resin with a structure as expressed by formula (1).

[Chemical formula 1]

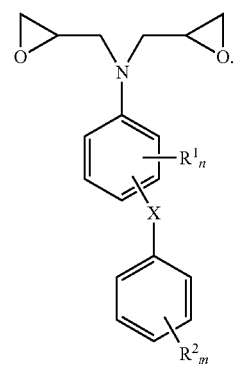

(1)

(In the above formula, both $R^1$ and $R^2$ represent at least one chosen from the group consisting of an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group and a nitro group. Where each or either of $R^1$ and $R^2$ exists at a plurality of sites, they may be either identical or different. Letter n represents an integer from 0 to 4, while m represents an integer from 0 to 5. X represents a difunctional epoxy resin having a form chosen from the group consisting of —O—, —S—, —CO—, —C(=O)O—, and —SO2-.)

According to another preferred embodiment of the present invention, the epoxy resin [A'] of the epoxy resin composition is a monofunctional epoxy resin having two or more ring structures based on 4 or more-membered rings and either a monoglycidyl amino group or glycidyl ether group directly bonded to a ring structure.

According to a preferred embodiment of the present invention, the curing agent [C'] of the epoxy resin composition is an aromatic amine.

According to a preferred embodiment of the present invention, the elastomer component [D'] is at least one chosen from the group consisting of a block copolymer and rubber particles.

The present invention encompasses any hardened resin obtained by curing the epoxy resin composition, any prepreg obtained by impregnation reinforcement fibers with the epoxy resin composition, and any fiber-reinforced composite material obtained by curing such a prepreg.

Effect of the Invention

Using the first preferred embodiment of the present invention, a fiber-reinforced composite material with excellent heat resistance and strength characteristics, including fiber-direction compressive strength and impact resistance, as well as an epoxy resin composition and prepreg as its precursor products, can be obtained.

In particular, a carbon fiber-reinforced composite material obtained by using this epoxy resin composition and carbon fibers as reinforcement fibers is advantageously used as structural materials in the aircraft and similar applications because of its high reliability attributable to a relatively small variation in characteristics it exhibits in response to changing molding conditions.

Using the second preferred embodiment of the present invention, a fiber-reinforced composite material that is low in volatility and excellent in heat resistance and strength characteristics, as well as an epoxy resin composition and prepreg as its precursor products, can be obtained In particular, a carbon fiber-reinforced composite material based on this epoxy resin composition is advantageously used as large, thick and curved structural materials, such as an aircraft main wing structure and windmill blade, as it possesses very high strength characteristics even at low temperatures.

DESCRIPTION OF EMBODIMENTS

The epoxy resin composition, prepreg and fiber-reinforced composite material in the first preferred embodiment of the present invention are described in more detail below.

The epoxy resin composition of the present invention contains an amine-type epoxy resin [A], an aromatic amine curing agent [B], and a block copolymer [C] having a reactive group capable of reacting with an epoxy resin.

With such an epoxy resin composition, it is necessary that the amine-type epoxy resin [A] account for 70 to 100 parts by weight of 100 parts by weight of total epoxy resin content, and it is preferable that it account for 80 to 100 parts by weight of 100 parts by weight of total epoxy resin content. If its amount falls below 70 parts by weight, there is no strength improvement effect on the fiber-reinforced composite material.

It is preferable that the amount of the difunctional epoxy resin contained in [A] be 20 to 50 parts by weight, more preferably 30 to 40 parts by weight, for 100 parts by weight of total epoxy resin content. In this range, the fiber-reinforced composite material exhibits excellent strength characteristics, while the reinforcement fiber impregnability of the epoxy resin composition improves because of low viscosity. The amount of the polyfunctional epoxy resin contained in [A] is preferably 30 to 70 parts by weight, and more preferably 40 to 60 parts by weight, for 100 parts by weight of total epoxy resin content. In this range, high heat resistance can be obtained.

Examples of the amine-type epoxy resin [A] advantageously used under the present invention include tetraglycidyl diaminodiphenyl methane, triglycidyl aminophenol, triglycidyl aminocresol, diglycidyl aniline, diglycidyl toluidine, tetraglycidyl xylylene diamine, halogen or alkyl substitution products thereof, and hydrogenated products thereof.

Commercially available products of tetraglycidyl diaminodiphenyl methane include "Sumiepoxy (registered trademark)" ELM434 (manufactured by Sumitomo Chemical Co., Ltd.), YH434L (manufactured by Nippon Steel Chemical Co., Ltd.), "jER (registered trademark)" 604 (manufactured by Mitsubishi Chemical Corporation), "Araldite (registered trademark)" MY720, and "Araldite (registered trademark)" MY721 (both manufactured by Huntsman Advanced Materials Gmbh). Commercially available products of triglycidyl aminophenol or triglycidyl aminocresol include "Sumiepoxy (registered trademark)" ELM100, and "Sumiepoxy (registered trademark)" ELM120 (both manufactured by Sumitomo Chemical Co., Ltd.), "Araldite (registered trademark)" MY0500, "Araldite (registered trademark)" MY0510, and "Araldite (registered trademark)" MY0600 (all manufactured by Huntsman Advanced Materials Gmbh), and "jER (registered trademark)" 630 (manufactured by Mitsubishi Chemical Corporation). Commercially available products of diglycidyl aniline include GAN (manufactured by Nippon Kayaku Co., Ltd.), and PxGAN (manufactured by Toray Fine Chemicals Co., Ltd.). Commercially available products of diglycidyl toluidine include GOT (manufactured by Nippon Kayaku Co., Ltd.). Commercially available products of tetraglycidyl xylylene diamine and their hydrogenated products include "TETRAD (registered trademark)"—X and "TETRAD (registered trademark)"—C (both manufactured by Mitsubishi Gas Chemical Co., Inc.).

Under the present invention, the aromatic amine curing agent [B] is an essential component for the curing of the epoxy resin. Concrete examples include various derivatives and isomers of diaminodiphenyl methane, diaminodiphenyl sulfone, aminobenzoic acid esters, and aromatic carboxylic acid hydrazide. These epoxy resin curing agents may be used singly or in combination. Of them, 3,3'-diaminodiphenyl sulfone, 4,4'-diaminodiphenyl sulfone and combinations of them are particularly advantageously used because of their excellent heat resistance and mechanical characteristics.

When using diaminodiphenyl sulfone as [B], the blended amount is determined by setting the amount of active hydrogen preferably at 0.6 to 1.2, more preferably 0.7 to 1.1, times the amount of the epoxy group in the epoxy resin from the viewpoint of heat resistance and mechanical characteristics. If the multiple is less than 0.6 times, the hardened material has an insufficient modulus of elasticity and heat resistance due to insufficient crosslink density, leading to unsatisfactory static strength characteristics of the fiber-reinforced composite material. If it exceeds 1.2 times, the hardened material has an insufficient plastic deformation capacity due to too high a crosslink density or water absorbent, leading to a poor impact resistance of the fiber composite material.

Commercial products of an aromatic amine curing agent include Seikacure S (manufactured by Wakayama Seika Kogyo Co., Ltd.), MDA-220, 3,3'-DAS (both manufactured by Mitsui Chemicals, Inc.), "jER Cure (registered trademark)" W (manufactured by Mitsubishi Chemical Corporation), Lonzacure (registered trademark)" M-DEA, "Lonzacure (registered trademark)" M-DIPA, "Lonzacure (registered trademark)" M-MIPA, and "Lonzacure (registered trademark) "DETDA 80 (all manufactured by Lonza).

It may also be possible to blend a mixture of those epoxy resin and curing agent or a partial pre-reaction product thereof into the composition. In some cases, this method is effective in adjusting the viscosity of the resin composition or improving storage stability.

With the epoxy resin composition of the present invention, it is essential that a block copolymer [C] having a reactive group capable of reacting with an epoxy resin be used. "A reactive group capable of reacting with an epoxy resin" as defined by the present invention means a functional group capable of reacting with any oxirane group within an epoxy molecule or any functional group in a curing agent. Examples include an oxirane group, amino group, hydroxyl group and carboxyl group, but it is not limited thereto. In particular, a block copolymer having a carboxyl group as such a reactive group is preferably used as it forms a fine phase separation structure and provides high toughness. In this regard, it is possible to use, for instance, a (meth)acrylic acid (a term used to commonly refer to both methacrylic acid and acrylic acid in the present Description) or a monomer, etc. capable of producing (meth)acrylic acid through hydrolytic reaction as a reactive monomer to give a reactive group to the block copolymer. Giving a reactive group to the block copolymer through the use of such a reactive monomer makes it possible to improve compatibility with epoxy resins, improve the bonding at the epoxy-block copolymer interface, and minimize the morphological variation associated with molding conditions.

It is also preferable that the block copolymer [C] having such a reactive group capable of reacting with an epoxy resin be at least one block copolymer chosen from the group consisting of S-B-M, B-M and M-B-M (hereinafter also referred to simply as "a block copolymer". This makes it possible to improve the toughness and impact resistance of the epoxy resin composition while maintaining its excellent heat resistance.

Each of the blocks denoted with the letters S, B, and, M is connected to the other by means of a covalent bond or an intermediate molecule connected to one of the blocks via a covalent bond and to the other block via another covalent bond.

Block M comprises a copolymer containing at least 50 mass % of a homopolymer of polymethyl methacrylate or methyl methacrylate. It is preferable that a reactive monomer be introduced into block M as a copolymerization component so as to enable the block copolymer [C] to react with any oxirane group of an epoxy molecule or any functional group in a curing agent.

Block B is incompatible with block M and has a glass transition (hereafter also referred to as "Tg") temperature of 20° C./or less. The glass transition temperature Tg of block B can be measured using the DMA method based on an RSAII (manufactured by Rheometrics, Inc.) whether it is the epoxy resin composition as a whole or a single block copolymer. Namely, a plate-shaped 1×2.5×34-mm specimen is measured using the DMA method as it is subjected to a driving frequency of 1 Hz over a temperature range of −100 to 250° C., with the glass transition temperature Tg found as the value of tan δ. Here, the specimen is prepared in the manner described as follows: When the specimen is an epoxy resin composition, an uncured resin composition is defoamed in a vacuum, and then cured at a temperature of 130° C. for two hours inside a mold set for a thickness of 1 mm using a 1 mm-thick Teflon (registered trademark) to obtain a void-free plate-shaped hardened material. In the case of a single block copolymer, a similarly void-free plate can be obtained using a biaxial extrusion machine. Such a plate is then cut to the size using a diamond cutter and evaluated.

Block S is incompatible with blocks B and M, and its glass transition temperature Tg is higher than that of block B.

It is preferable that any of blocks S, B and M in the case of an S-B-M block copolymer and either of blocks B and M in the case of a B-M or M-B-M block copolymer be compatible with epoxy resins from the viewpoint of improving toughness.

The blending amount of the block copolymer [C], having a reactive group capable of reacting with an epoxy resin, is preferably 2 to 15 parts by weight, more preferably 3 to 10 parts by weight and ideally 4 to 8 parts by weight, for 100 parts by weight of total epoxy resin content from the viewpoint of mechanical characteristics and amenability to the composite production process. If the blending amount falls below two parts by weight, the toughness and plastic deformation capacity of the hardened material will be reduced, leading to a low impact resistance of the fiber-reinforced composite material. If the blending amount exceeds 15 parts by weight, the modulus of elasticity of the hardened material falls dramatically, leading to a significant reduction in the static strength characteristics of the fiber-reinforced composite material obtained, combined with a tendency for the fiber-reinforced composite material to contain voids due to inadequate resin flows at the molding temperature.

The glass transition temperature Tg of block B needs to be 20° C. or less, preferably 0° C. or less, and more preferably −40° C. or less. As far as toughness is concerned, the lower the glass transition temperature Tg, the more desirable, but if it falls below −100° C., problems with processability, such as a rough cutting surface on the fiber-reinforced composite material, may arise.

It is preferable that block B be an elastomer block, and the monomer used to synthesize such an elastomer block is preferably a diene selected from butadiene, isoprene, 2,3-dimethyl-1,3-butadiene, 1,3-pentadiene, and 2-phenyl-1,3-butadiene. It is particularly preferable that one be selected from polybutadienes, polyisoprenes, random copolymers thereof and partial or fully hydrogenated polydienes from the viewpoint of toughness. Of all polybutadienes, 1,2-polybutadiene (Tg: approx. 0° C.) and the like may be chosen, but it is more preferable to use choices found in the lowest range of glass transition temperatures Tg, such as 1,4-polybutadiene (Tg: approx. −90° C.). This is because it is advantageous to use block B with the lowest possible glass transition temperature Tg from the viewpoint of impact resistance and toughness. Block B may be hydrogenated. Such hydrogenation is carried out by the usual method.

As the monomer constituting block B, alkyl (meth)acrylate is also preferable. Concrete examples include ethyl acrylate (−24° C.), butyl acrylate (−54° C.), 2-ethylhexyl acrylate (−85° C.), hydroxyethyl acrylate (−15° C.), and 2-ethylhexyl meta-acrylate (−10° C.). Here, the figure shown in brackets following the name of each acrylate is the glass transition temperature Tg of block B when that acrylate is used. Of those acrylates, it is preferable to use butyl acrylate. These acrylate monomers are incompatible with the block M acrylate containing at least 50 mass % of methyl methacrylate.

Of these choices, it is preferable that block B comprise a polymer selected from 1,4-polybutadiene, polybutyl acrylate, and poly(2-ethylhexyl acrylate).

When triblock copolymer S-B-M is used as the block copolymer, block S is incompatible with block B and M, and its glass transition temperature Tg is higher than that of block B. The Tg or melting point of block S is preferably 23° C. or more, more preferably 50° C. or more. Block S may be based on, for instance, an aromatic vinyl compound, such as styrene, α-methyl styrene or vinyl toluene, or alkyl acid having an alkyl chain containing one to 18 carbon atoms and/or an alkyl ester of methacrylic acid. Block S obtained from alkyl acid having an alkyl chain containing one to 18 carbon atoms and/or an alkyl ester of methacrylic acid is incompatible with block M containing at least 50 mass % of methyl methacrylate.

When using triblock copolymer M-B-M as the block copolymer, the two block Ms in the triblock copolymer M-B-M may be identical or different. They can be based on the same monomer but with different molecular weights.

When using triblock copolymer M-B-M and diblock copolymer B-M in combination as the block copolymer, block Ms in the triblock copolymer M-B-M and block M in diblock copolymer B-M may be identical or different, while block B in triblock copolymer M-B-M and block B in diblock copolymer B-M may also be identical or different.

When using triblock copolymer S-B-M, diblock copolymer B-M and/or triblock copolymer M-B-M in combination as a block copolymer, block M in triblock copolymer S-B-M, block Ms in triblock copolymer M-B-M and block M in diblock copolymer B-M may be identical or different. Similarly, block Bs in triblock copolymer S-B-M, triblock copolymer M-B-M, and diblock copolymer B-M may also be identical or different.

Block copolymers may be produced through anionic polymerization. For instance, methods described in European Patent No. EP 524,054, Official Gazette, and European Patent No. EP 749,987, Official Gazette, may be used for their production.

Concrete examples of a block copolymer having a reactive group capable of reaction include a methyl methacrylate-butyl acrylate-methyl methacrylate, which introduces a triblock copolymer carboxyl group as a copolymerization component, typical commercial products of which include "Nanostrength (registered trademark)" SM4032XM10 (manufactured by Arkema K.K.).

The epoxy resin composition of the present invention allows the addition of an epoxy resin other than [A] for the purpose of improving workability through adjustment of uncured viscoelasticity, as well as the modulus of elasticity and heat resistance of the cured resin. The additional epoxy resin may comprise a single type or combination of two or more types. Concrete examples include a bisphenol-type epoxy resin, phenol novolac-type epoxy resin, cresol novolac-type epoxy resin, resorcinol-type epoxy resin, dicyclopentadiene-type epoxy resin, biphenyl-backbone epoxy resin, and urethane and isocyanate-modified epoxy resin.

Commercial products of a bisphenol-type epoxy resin include "jER (registered trademark)" 806, "jER (registered trademark)" 807, "jER (registered trademark)" 825, "jER (registered trademark)" 828, "jER (registered trademark)" 834, "jER (registered trademark)" 1001, "jER (registered trademark)" 1002, "jER (registered trademark)" 1003, "jER (registered trademark)" 1004, "jER (registered trademark)" 1004AF, "jER (registered trademark)" 1005F, "jER (registered trademark)" 1006FS, "jER (registered trademark)" 1007, "jER (registered trademark)" 1009, "jER (registered trademark)" 4002P, "jER (registered trademark)" 4004P, "jER (registered trademark)" 4007P, "jER (registered trademark)" 4009P, "jER (registered trademark)" 5050, "jER (registered trademark)" 5054 and "jER (registered trademark)" 5057 (all manufactured by Mitsubishi Chemical Corporation), and "Epotohto (registered trademark)" YDF2004 and YSLV-80XY (both Nippon Steel Chemical Co., Ltd.), and "Epicron (registered trademark)" FAA-1514 (manufactured by DIC).

Commercial products of a phenol novolac-type epoxy resin include "Epikote (registered trademark)" 152 and "Epikote (registered trademark)" 154 (both manufactured by Mitsubishi Chemical Corporation), and "Epicron (registered trademark)" N-740, "Epicron (registered trademark)" N-770 and "Epicron (registered trademark)" N-775 (all manufactured by DIC).

Commercial products of a cresol novolac-type epoxy resin include "Epicron (registered trademark)" N-660, "Epicron (registered trademark)" N-665, "Epicron (registered trademark)" N-670, "Epicron (registered trademark)" N-673 and "Epicron (registered trademark)" N-695 (all manufactured by DIC), and EOCN-1020, EOCN-102S and EOCN-104S (all manufactured by Nippon Kayaku Co., Ltd.).

Commercial products of a resorcinol-type epoxy resin include "Denacol (registered trademark)" EX-201 (manufactured by Nagase ChemteX Corporation).

Commercial products of a dicyclopentadiene-type epoxy resin include "Epicron (registered trademark)" HP7200, "Epicron (registered trademark)" HP7200L and "Epicron (registered trademark)" HP7200H (all manufactured by DIC), Tactix 558 (manufactured by Huntsman Advanced Materials Gmbh), and XD-1000-1L and XD-1000-2L (both manufactured by Nippon Kayaku Co., Ltd.).

Commercial products of a biphenyl-backbone epoxy resin include "Epikote (registered trademark)" YX4000H, "Epikote (registered trademark)" YX4000 and "Epikote (registered trademark)" YL6616 (all manufactured by Mitsubishi Chemical Corporation), and NC-3000 (manufactured by Nippon Kayaku Co., Ltd.).

Commercial products of a urethane and isocyanate-modified epoxy resin include oxazolidone-ringed AER4152 (manufactured by Asahi Kasei E-materials Corp.) and ACR1348 (manufactured by ADEKA Corp.).

Any components other than epoxy resins, [B] and [C] may also be contained to the extent that all the effects described in the "Effect of the present invention" section can be maintained. For instance, the epoxy resin composition of the present invention allows the blending of a thermoplastic resin soluble in an epoxy, organic particles (e.g. rubber particles and thermoplastic resin particles), inorganic particles, and other ingredients into the epoxy resin in order to improve the tackiness and drapability of the prepreg through viscoelasticity control and improve the impact resistance and other mechanical characteristics of the fiber-reinforced composite material.

It is preferable to blend into the epoxy resin a thermoplastic resin having a hydrogen-bonding functional group, such as an alcoholic hydroxyl group, amide bond and sulfonyl group because of an expected bonding improvement effect between the resin and the reinforcement fibers. Concrete examples of a thermoplastic resin having an alcohol hydroxyl group include a polyvinyl acetal resin, such as polyvinyl formal and polyvinyl butyral, polyvinyl alcohol, and phenoxy resin; concrete examples of thermoplastic resin having an amide bond include polyamide, polyimide, and polyvinyl pyrolidone; a thermoplastic resin having a sulfonyl group include polysulfone. Polyamide, polyimide and polysulfone may have a functional group, such as an ether bond and carbonyl group, on their backbone chains. Polyamide may have a substituent group on the nitrogen atom as part of the amide group. Commercial products of an epoxy resin-soluble thermoplastic resin having a hydrogen-bonding functional group include Denka Butyral and "Denka Formal (registered trademark)" (manufactured by Denki Kagaku Kogyo K.K.) and "Vinylec (registered trademark)" (manufactured by Chisso Corporation) in terms of a polyvinyl acetal resin, "UCAR (registered trademark)" and PKHP (manufactured by Union Carbide Corp.) in terms of a phenoxy resin, "Macromelt (registered trademark)" (manufactured by Henkel Hakusui Corporation) and "Amilan (registered trademark)" CM4000 (manufactured by Toray Industries, Inc.) in terms of a polyamide resin, "Ultem (registered trademark)" (manufactured by General Electric Co.) and "Matrimid (registered trademark)" 5218 (manufactured by Nihon Ciba-Geigy K.K.) in terms of polyimide, "Victrex (registered trademark)" (manufactured by Mitsui Chemicals, Inc.) in terms of polysulfone, "UDEL (registered trademark)" (manufactured by Union Carbide Corp.) in teems of polysulfone, and "Luviskol (registered trademark)" (manufactured by BASF Japan Ltd.) in terms of polyvinyl pyrolidone.

Thermoplastic resins soluble in an epoxy resin other than those mentioned above include acrylic resins, which are advantageously used for viscoelasticity control because of their high compatibility with epoxy resins. Commercial products of an acrylic resin include "Dianal (registered trademark)" BR series (manufactured by Mitsubishi Rayon Co., Ltd.), and "Matsumoto Microsphere (registered trademark)" M, M100 and M500 (manufactured by Matsumoto Yushi-Seiyaku Co., Ltd.).

As rubber particles, crosslinked rubber particles and core-shell rubber particles, produced by growing a dissimilar polymer on the surface of crosslinked rubber particles through graft polymerization, are advantageously used from the viewpoint of ease of handling, etc.

Commercially available products of crosslinked rubber particles include FX501P (manufactured by Japan Synthetic Rubber Co., Ltd.), which comprises a crosslinked product of a carboxyl-modified butadiene-acrylonitrile copolymer, CX-MN series (manufactured by Nippon Shokubai Co., Ltd.), which comprises acrylic rubber fine particles, and YR-500 series (manufactured by Nippon Steel Chemical Co., Ltd.).

Commercially available products of core-shell rubber particles include "Paraloid (registered trademark)" EXL-2655 (manufactured by Kureha Chemical Industry Co., Ltd.), which comprises a copolymerization product of butadiene, methacrylic acid alkyl and styrene, "Stafiloid (registered trademark)" AC-3355 and TR-2122 (manufactured by Takeda Pharmaceutical Co., Ltd.), which comprises a copolymerization product of acrylate and methacrylate, "PARALOID (registered trademark)" EXL-2611 and EXL-3387 (manufactured by Rohm and Haas Co.), which comprises a copolymerization product of butyl acrylate and methyl methacrylate, and "Kane Ace (registered trademark)" MX series (manufactured by Kaneka Corp.).

Polyamide particles and polyimide particles are advantageously used as thermoplastic resin particles. Commercial products of polyamide particles include SP-500 (manufactured by Toray Industries, Inc.), "Toraypearl (registered trademark)" TN (manufactured by Toray Industries, Inc.), "Orgasol (registered trademark)" 1002D (manufactured by ATOCHEM), "Orgasol (registered trademark)" 2002 (manufactured by ATOCHEM), "Orgasol (registered trademark)" 3202 (manufactured by ATOCHEM), and Trogamid T5000.

In the preparation of the epoxy resin composition of the present invention, a kneader, planetary mixer, triple roll mill, twin screw extruder, and the like may advantageously be used. First, the block copolymer [C] is added to the amine-type epoxy resin [A] and kneaded. The mixture is then heated to a selected temperature between 130 to 180° C. while being stirred, and kept at that temperature under continued stirring to have the block copolymer [C] to dissolve in the epoxy resin. After a transparent viscous liquid, resulting from the dissolution of the block copolymer [C] in the epoxy resin, is obtained, the temperature is lowered, preferably to 120° C. or less, more preferably to 100° C. or less, followed by the addition of the aromatic amine curing agent [B] and a curing catalyst and kneading. This method is advantageously used as it minimizes the occurrence of coarse phase separation of the block copolymer [C], while offering excellent storability of the epoxy resin composition.

When an epoxy resin composition of the present invention is used as the matrix resin of a prepreg, its viscosity at 80° C. is preferably in the 0.1 to 200 Pa·s range, more preferably in the 0.5 to 100 Pa·s range and ideally in the 1 to 50 Pa·s range, from the viewpoint of processability, including tackiness and drapability. If its viscosity at 80° C. falls below 0.1 Pa·s, the prepreg is left with low shape retainability, and cracks are sometimes generated, with unevenness in fiber density sometimes caused due to excessive resin flows during the molding process. If the viscosity at 80° C. exceeds 200 Pa·s, surface scratchiness of the epoxy resin composition may occur during the resin film preparation process, as well as a partial failure to penetrate into reinforcement fibers during the impregnation process.

In the case of application to prepregs for aircraft primary structural materials, the minimum viscosity of the epoxy resin composition of the present invention is preferably in the 0.05 to 20 Pa·s, more preferably in the 0.1 to 10 Pa·s, range. If the minimum viscosity falls below 0.05 Pa·s, the prepreg is left with low shape retainability, and cracks sometimes develop, with unevenness in fiber density sometimes caused due to excessive resin flows during the molding process. If the minimum viscosity exceeds 20 Pa·s, surface scratchiness of the epoxy resin composition may occur during the resin film preparation process, as well as a partial failure to penetrate into reinforcement fibers during the impregnation process.

Here, "viscosity" means complex viscoelastic modulus $\eta^*$ as measured at a frequency of 0.5 Hz and a gap length of 1 mm using a dynamic viscoelastic measuring device (Rheometer RDA2 manufactured by Rheometrics, Inc.) and circular parallel plates 40 mm in diameter, while temperature is monotonically increased at a rate of 2° C.//min. ° C.//

With the epoxy resin composition of the present invention, its block copolymer [C] undergoes phase separation during the curing process, leading to the formation of a fine phase separation structure. More precisely, of the multiple block copolymers constituting the block copolymer [C], only those that have low compatibility with the epoxy resin undergo phase separation during the curing time, and the phase separation structure results from this. It is preferable that, when cured at 180° C. for two hours, the epoxy resin composition of the present invention Ruin a phase separation structure ranging in size from 0.01 to 5 µm. Here, the size of a phase separation structure (hereinafter referred to as "phase separation size") means, in the case of a sea-island structure, the number average size of island phases. If an island phase is elliptical, the length of the major axis represents its size, and, if it is randomly shaped, the diameter of its circumscribing circle is used. In the case of an island phase shaped like nested circles or ellipses, the diameter of the outermost circle or the major axis of the outermost ellipse is used.

To determine the number average size of island phases as phase separation size for a sea-island structure as mentioned above, the lengths of the major axes of all island phases present in a predetermined region are measured. On the basis of a microscopic photograph, such a predetermined region is set as follows: When phase separation size is expected to be in the order of 10 nm (10 nm or more and less than 100 nm), the predetermined region is the combined whole of three 4 mm-square regions randomly selected on a photograph taken at a magnification of ×20,000 (200 nm-square regions on the specimen). Similarly, when phase separation size is expected to be in the order of 100 nm (100 nm or more and less than 1000 nm), the predetermined region is the combined whole of three 4 mm-square regions randomly selected on a photograph taken at a magnification of ×2000 (2 µm-square regions on the specimen), and, when phase separation size is expected to be in the order of 1 µm (1 µm or more and less than 10 µm), it is the combined whole of three 4 mm-square regions randomly selected on a photograph taken at a magnification of ×200 (20 µm-square regions on the specimen). If the measured phase separation size falls outside the expected range, a repeat measurement is made of the same region at the magnification that corresponds to the actual phase separation size. In the case of a continuous phase structure, a straight line of a predetermined length is drawn on a microscopic photograph, and intersections between this straight line and the phase interface are located. Distances between adjacent intersections are then measured, with their number average calculated as phase separation size. On the basis of a microscopic photograph, such a predetermined length is set as follows: When phase separation size is expected to be in the order of 10 nm (10 nm or more and less than 100 nm), the predetermined length is the combined whole of three 20 mm-long straight lines randomly drawn on a photograph taken at a magnification of ×20,000 (1000 nm-long straight lines on the specimen). Similarly, when phase separation size is expected to be in the order of 100 nm (100 nm or more and less than 1000 nm), the predetermined length is the combined whole of three 20 mm-long straight lines randomly drawn on a photograph taken at a magnification of ×2000 (10 µm-long straight lines on the specimen), and, if phase separation size is expected to be in the order of 1 µm (1 µm or more and less than 10 µm), the predetermined length is the combined whole of three 20 mm-long straight lines randomly drawn on a photograph taken at a magnification of ×200 (100 µm-long straight lines on the specimen). If the measured phase separation size falls outside the expected range, a repeat measurement is made of the same line at the magnification that corresponds to the actual phase separation size. In any case, island phases are recognized as such and measured if they are at least 0.1 mm in size on a photograph. Phase separation size is more preferably in the 10 to 500 nm, most preferably in the 10 to 200 nm, range, and ideally in the 15 to 100 nm range. If phase separation size falls below 10 nm, the toughness of the hardened material, and the impact resistance of the fiber-reinforced composite material, may be insufficient. If phase separation is coarse and in excess of 500 nm in size, the plastic deformation capacity and toughness of the hardened material and the impact resistance of the fiber-reinforced composite material may be insufficient. The structure of these phase separations may be examined by observing a cross section of a hardened resin material using a scanning electron microscope or transmission electron microscope. If needed, staining may be performed using osmium or some other stain. Any common staining method may be followed.

It is preferable that the dependence that the size of the phase separation structure has on molding conditions be sufficiently small. Such small dependence helps minimize morphological variation during the molding process, leading to stable mechanical characteristics even in applications such as large aircraft structural materials, thanks to the formation of a uniform phase separation structure. In concrete terms, when the rate at which temperature is increased from 1.5° C./min to 5° C./min during the molding time, for instance, variation in the phase separation structure size is kept preferably within ±20% and more preferably within ±10%.

Reinforcement fibers used under the present invention preferably include glass fiber, carbon fiber, graphite fiber, aramid fiber, boron fiber, alumina fiber, and silicon carbide fiber. While two or more of these reinforcement fibers may be mixed, it is preferable to use carbon fiber or graphite fiber to obtain lighter and more durable molded products. In applications where materials are subject to particularly stringent lightweight and high strength requirements, carbon fiber is preferably used for its excellent specific modulus of elasticity and specific strength.

Although all kinds of carbon fiber may be advantageously used under the present invention according to a given application, they preferably have a tensile modulus of up to 400 GPa from the viewpoint of impact resistance. From the viewpoint of strength, carbon fibers with a tensile strength of 4.4 to 6.5 GPa are preferably used as they provide high rigidity and high mechanical strength composite materials. With tensile elongation being another important element, it is preferable that high strength high extensibility carbon fibers with a tensile elongation rate of 1.7 to 2.3% be used. The most desirable carbon fiber is, therefore, one that combines these characteristics: a tensile modulus of at least 230 GPa, a tensile strength of at least 4.4 GPa, and a tensile elongation rate of at least 1.7%.

Commercial products of carbon fibers include "Torayca (registered trademark)" T800G-24K, "Torayca (registered trademark)" T800S-24K, "Torayca (registered trademark)" T700G-24K, "Torayca (registered trademark)" T300-3K, and "Torayca (registered trademark)" T700S-12K (all manufactured by Toray Industries, Inc.).

In terms of form and configuration, carbon fibers may be selected from long fibers (drawn in one direction), woven fabrics and other varieties as appropriate, but, to obtain high-standard lightweight and durable carbon fiber-reinforced composite materials, it is preferable that carbon fibers be of a continuous fiber form, including long fibers (bundles) and woven fabrics.

Carbon fiber bundles used under the present invention preferably have a monofilament fineness of 0.2 to 2.0 dtex, more preferably 0.4 to 1.8 dtex. If monofilament fineness is less than 0.2 dtex, carbon fiber bundles are susceptible to damage during twining due to contact with guide rollers, with similar damage also possible at the resin composition impregnation treatment step. If monofilament fineness exceeds 2.0 dtex, a resin composition sometimes fails to sufficiently penetrate carbon fiber bundles, resulting in low fatigue resistance.

It is preferable that the number of filaments per bundle of carbon fiber bundles used under the present invention be in the 2500 to 50,000 range. If the number of filaments falls below 2500, the laid-out fibers tend to snake, causing a reduction in strength. If the number of filaments exceeds 50,000, it may be difficult to have resin penetrate during prepreg preparation or molding. The number of filaments is more preferably in the 2800 to 40000 range.

The prepreg of the present invention is produced by impregnating the reinforcement fibers with the epoxy resin composition. Such a prepreg preferably has a fiber mass fraction of 40 to 90 mass % and more preferably 50 to 80 mass %. If the fiber mass fraction is too low, the composite material becomes too heavy, and this may undermine the advantage of a fiber-reinforced composite material in terms of its excellent specific strength and specific modulus of elasticity. If the fiber mass fraction is too high, impregnation with a resin composition tends to be unsatisfactory, leading to a dramatic reduction in mechanical characteristics of the composite material due to the formation of a large number of voids.

There are no specific limitations to the form of a reinforcement fiber. For instance, long fibers (drawn in one direction), tow, woven fabrics, mats, knits, and braids may be used. In applications where particularly high specific strength and specific modulus are required, the linear configuration, in which reinforcement fibers are drawn in one direction, is most suitable, but the cloth (woven fabric) configuration, which is easier to handle is also suited to the present invention.

The prepreg of the present invention may be prepared using the wet method, in which a matrix resin is dissolved into a solvent, such as methyl ethyl ketone or methanol, to reduce its viscosity and made to impregnate reinforcement fibers, the hot-melt method (dry method), in which a matrix resin is heated to reduce its viscosity and made to impregnate reinforcement fibers, and other methods In the wet method, reinforcement fibers are first immersed in a solution of an epoxy resin composition as a matrix resin and retrieved, and then the solvent is removed through evaporation using an oven, etc. The hot-melt method may be implemented by impregnating reinforcement fibers directly with an epoxy resin composition, made fluid by heating in advance, or by first coating a piece or pieces of release paper or the like with an epoxy resin composition for use as resin film and then placing a film over one or both side(s) of reinforcement fibers as configured into a flat shape, followed by the application of heat and pressure to impregnate the reinforcement fibers with resin. The hot-melt method is preferable in the present invention as the prepreg has virtually no residual solvent in it.

Fiber-reinforced composite materials of the present invention are produced using methods such as the lamination of obtained prepregs, followed by curing of the resin through a simultaneous application of heat and pressure to the laminate.

Here, methods for a simultaneous application of heat and pressure encompass, among other things, press forming, autoclave forming, bag forming, wrapping tape, and internal pressure forming.

Fiber-reinforced composite materials of the present invention may also be prepared using a method based on a direct reinforcement fiber impregnation with an epoxy resin composition followed by thermal curing without going through a prepreg preparation step. Examples include the hand lay-up method, filament winding method, pultrusion method, resin injection molding method, resin transfer molding method, and other molding methods. With these methods, it is preferable that an epoxy resin composition be prepared immediately before use by mixing the base resin, which comprises epoxy resins, and an epoxy resin curing agent.

Fiber-reinforced composite materials that use an epoxy resin composition of the present invention as the matrix resin are advantageously used in sports applications, aircraft applications, and general industrial applications. In concrete terms, advantageous aerospace applications include aircraft primary structural materials, such as main wings, tail units and floor beams, and secondary structural materials, such as flaps, ailerons, cowlings, fairings and interior materials, as well as rocket motor cases and satellite structural materials. Of all aerospace applications, fiber-reinforced composite materials of the present invention are particularly advantageously used in aircraft primary structural materials, especially fuselage skin and main wing skin, because of the high impact resistance requirements and stringent requirements for low-temperature tensile strength due to the exposure to low temperatures during high-altitude flights. Suitable sports applications include golf shafts, fishing rods, tennis, badminton or squash rackets, hockey sticks, and ski poles. Suitable general industrial applications include structural materials for vehicles, such as automobiles, marine vessels and railway trains, drive shafts, flat springs, windmill blades, pressure vessels, flywheels, papermaking rollers, roofing materials, cables, reinforcing bars, repair/reinforcement materials, and other architectural or civil engineering materials.

The epoxy resin composition, prepreg and fiber-reinforced composite material in the second preferred embodiment of the present invention are described in more detail below.

The epoxy resin composition of the present invention comprises an epoxy resin having two or more ring structures based on 4 or more-membered rings and either a glycidyl amino group or glycidyl ether group directly bonded to a ring structure [A'], an at least trifunctional epoxy resin [B'], a curing agent [C'] and an elastomer component [D'].

"Having two or more ring structures based on 4 or more-membered rings" as stated with regard to the epoxy resin [A'], a component of the epoxy resin composition of the present invention, means having two or more single ring structures based on 4 or more-membered rings, like cyclohexane, benzene, and pyridine, or having at least one condensed ring structure based on 4 or more-membered rings, like phthalimide, naphthalene, and carbazole.

"Either a glycidyl amino group or glycidyl ether group directly bonded to a ring structure" as stated with regard to the epoxy resin [A'] means having a structure in which an N atom in the case of a glycidyl amino group or an O atom in the case of a glycidyl ether group is directly bonded to a benzene or other ring structure. Cases in which a glycidyl amino group is incorporated into a ring, including a glycidyl group bonded to an N atom that forms a part of a ring as exemplified by phthalimide also constitute a structure in which a glycidyl amino group directly bonded to a ring structure of the epoxy resin [A']. Such a glycidyl amino group exists in two forms: a monoglycidyl amino group and a diglycidyl amino group. This means that a glycidyl amino group signifies a monofunctional or difunctional epoxy resin, while a glycidyl ether group signifies a monofunctional epoxy resin. (Hereinafter, an monofunctional epoxy resin [A'] and a difunctional epoxy resin [A'] may also be denoted as [A'1] and [A'2], respectively.)

If the amount of the epoxy resin [A'] contained is too small, there is hardly any strength improving effect on the carbon fiber-reinforced composite material, while, if the amount of the epoxy resin [A'] contained is too large, its heat resistance is significantly undermined. For this reason, the blending amount of [A'] needs to be 50 to 60 mass % of total epoxy resin content. Meanwhile, a monofunctional epoxy resin used as [A'] has excellent strength characteristics, while a difunctional epoxy resin has excellent in resistance. For this reason, the blending amount of [A'] is preferably 10 to 40 mass %, more preferably 15 to 30 mass %, of total epoxy resin content for [A'1]. In the case of [A'2], the blending amount is preferably 25 to 60 mass %, more preferably 30 to 50 mass %, of total epoxy resin content.

Examples of the epoxy resin [A'1] used under the present invention include glycidylphthalimide, glycidyl-1,8-naphthalimide, glycidyl carbazole, glycidyl-3,6-dibromocarbazole, glycidyl indole, glycidyl-4-acetoxy indole, glycidyl-3-methyl indole, glycidyl-3-acetyl indole, glycidyl-5-methoxy-2-methyl indole, o-phenyl phenyl glycidyl ether, p-phenyl phenyl glycidyl ether, p-(3-methyl phenyl) phenyl glycidyl ether, 2,6-dibenzyl phenyl glycidyl ether, 2-benzyl phenyl glycidyl ether, 2,6-diphenyl phenyl glycidyl ether, 4-α-cumyl phenyl glycidyl ether, o-phenoxy phenyl glycidyl ether, and p-phenoxy phenyl glycidyl ether.

Examples of the epoxy resin [A'2] used under the present invention include N,N-diglycidyl-4-phenoxy aniline, N,N-diglycidyl-4-(4-methyl phenoxy)aniline, N,N-diglycidyl-4-(4-tert-butyl phenoxy)aniline, and N,N-diglycidyl-4-(4-phenoxy phenoxy)aniline. These resins are, in many cases, obtained by adding epichlorohydrin to a phenoxy aniline derivative and achieving alkali cyclization. As viscosity increases with increasing molecular weight, N,N-diglycidyl-4-phenoxy aniline, in which $R^1$ and $R^2$ of the epoxy resin [A'2] are both hydrogen, are particularly advantageously used from the viewpoint of ease of handling.

Concrete examples of a phenoxy aniline derivative include 4-phenoxy aniline, 4-(4-methyl phenoxy)aniline, 4-(3-methyl phenoxy)aniline, 4-(2-methyl phenoxy)aniline, 4-(4-ethyl phenoxy)aniline, 4-(3-ethyl phenoxy)aniline, 4-(2-ethyl phenoxy)aniline, 4-(4-propyl phenoxy)aniline, 4-(4-tert-butyl phenoxy)aniline, 4-(4-cyclohexyl phenoxy) aniline, 4-(3-cyclohexyl phenoxy)aniline, 4-(2-cyclohexyl phenoxy)aniline, 4-(4-methoxy phenoxy) aniline, 4-(3-methoxy phenoxy)aniline, 4-(2-methoxy phenoxy)aniline, 4-(3-phenoxy phenoxy)aniline, 4-(4-phenoxy phenoxy)aniline, 4-[4-(trifluoro methyl) phenoxy]aniline, 4-[3-(trifluoro methyl) phenoxy]aniline, 4-[2-(trifluoro methyl) phenoxy] aniline, 4-(2-naphthyl oxy phenoxy)aniline, 4-(1-naphthyl oxy phenoxy)aniline, 4-[(1,1'-biphenyl-4-yl)oxy]aniline, 4-(4-nitro phenoxy)aniline, 4-(3-nitro phenoxy)aniline, 4-(2-nitro phenoxy)aniline, 3-nitro-4-aminophenyl phenyl ether, 2-nitro-4-(4-nitro phenoxy)aniline, 4-(2,4-nitro phenoxy)aniline, 3-nitro-4-phenoxy aniline, 4-(2-chlorophenoxy)aniline, 4-(3-chlorophenoxy)aniline, 4-(4-chlorophenoxy)aniline, 4-(2,4-dichlorophenoxy)aniline, 3-chloro-4-(4-chlorophenoxy)aniline, and 4-(4-chloro-3-tolyl oxy) aniline.

Next, the production methods for the epoxy resin [A'2] used under the present invention are described by way of an example.

The epoxy resin [A'2] used under the present invention may be produced from a reaction between a phenoxy aniline derivative expressed with general formula (2) shown below:

[Chemical formula 2]

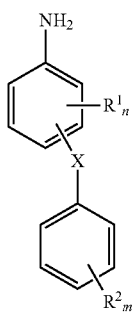

(2)

($R^1$ and $R^2$ shown in the formula each represent at least one chosen from the group consisting of an aliphatic hydrocarbon group with a carbon number of 1 to 4, alicyclic hydrocarbon group with a carbon number of 3 to 6, aromatic hydrocarbon group with a carbon number of 6 to 10, halogen atom, acyl group, trifluoro methyl group, and nitro group. If $R^1$ and/or $R^2$ exist at plurality of sites, they may be either identical or different. Letters n and m represent an integer from 0 to 4 and an integer from 0 to 5, respectively. X represent any member chosen from the group consisting of —O—, —S—, —CO—, —C(=O)O—, and —SO2-) and epichlorohydrin.

Namely, like the production method for a general epoxy resin, the production method for the epoxy resin [A'2] comprises an affixation process in which two molecules of epichlorohydrin are attached to one molecule of phenoxy aniline derivative to produce a dichlorohydrin compound expressed with general formula (3) shown below:

[Chemical formula 3]

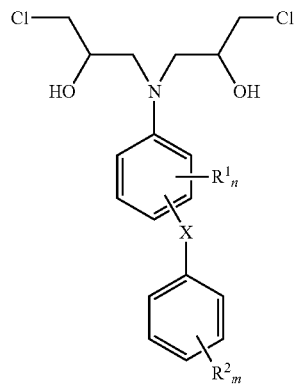

(3)

($R^1$ and $R^2$ shown in the formula each represent at least one chosen from the group consisting of an aliphatic hydrocarbon group with a carbon number of 1 to 4, alicyclic hydrocarbon group with a carbon number of 3 to 6, aromatic hydrocarbon group with a carbon number of 6 to 10, halogen atom, acyl group, trifluoro methyl group, and nitro group. If $R^1$ and/or $R^2$ exist at plurality of sites, they may be either identical or different. Letters n and m represent an integer from 0 to 4 and an integer from 0 to 5, respectively. X represents any member chosen from the group consisting of —O—, —S—, —CO—, —C(=O)O—, and —SO2-), followed by a cyclization process in which the dichlorohydrin compound is dehydrochlorinated using an alkali compound to produce an epoxy compound, a difunctional epoxy compound expressed with general formula (1) shown below:

[Chemical formula 4]

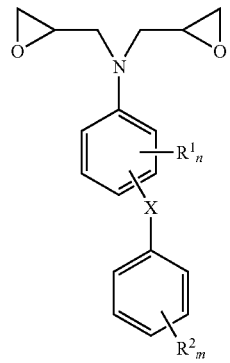

(1)

($R^1$ and $R^2$ shown in the formula each represent at least one chosen from the group consisting of an aliphatic hydrocarbon group with a carbon number of 1 to 4, alicyclic hydrocarbon group with a carbon number of 3 to 6, aromatic hydrocarbon group with a carbon number of 6 to 10, halogen atom, acyl group, trifluoro methyl group, and nitro group. If $R^1$ and/or $R^2$ exist at a plurality of sites, they may be either identical or different. Letters n and m represent an integer from 0 to 4 and an integer from 0 to 5, respectively. X represents any member chosen from the group consisting of —O—, —S—, —CO—, —C(=O)O—, and —SO2-).

If the proportion of the epoxy resin expressed with general formula (1) is too small, there is no significant strength improvement effect on the fiber-reinforced composite material, and, if it is too large, heat resistance is undermined. For these reasons, it is preferably 25 to 50 parts by weight, more preferably 30 to 50 parts by weight, for 100 parts by weight of total epoxy resin content, which combines epoxy resin [A'] and epoxy resin [B'].

Commercial products of [A'1] include "Denacol (registered trademark)" Ex-731 (glycidylphthalimide, manufactured by Nagase ChemteX Corporation) and OPP-G (o-phenyl phenyl glycidyl ether, manufactured by Sanko Co., Ltd.), and commercial products of [A'2] include PxGAN (diglycidyl-p-phenoxy aniline (corresponding to a case with m=0 and n=0 in general formula (1)), manufactured by Toray Fine Chemicals Co., Ltd.).

The trifunctional or more epoxy resin [B'] used under the present invention is a compound having three or more epoxy groups in a single molecule. Examples of the trifunctional or more epoxy resin [B'] include a glycidyl amine-type epoxy resin and a glycidyl ether-type epoxy resin.

The number of functional groups that the trifunctional or more epoxy resin [B'] has is preferably three to seven and more preferably three to four. If there are too many functional groups, the matrix resin may become brittle after curing, thus undermining impact resistance.

Examples of a trifunctional or more glycidyl amine-type epoxy resin include epoxy resins of the diaminodiphenyl methane type, diaminodiphenyl sulfone type, aminophenol type, meta-xylene diamine type, 1,3-bisaminomethyl cyclohexane type, and isocyanurate type. Of these, diaminodiphenyl methane type and aminophenol-type epoxy resins are particularly advantageously used because of their well-balanced physical characteristics.

Examples of a trifunctional or more glycidyl ether-type epoxy resin include epoxy resins of the phenol novolac-type, orthocresol novolac-type, tris-hydroxyphenyl methane type, and tetraphenylol ethane type.

If the blending amount of the trifunctional or more epoxy resin [B'] is too small, heat resistance is undermined, and, if it is too large, a brittle material may result due to too high a crosslink density, leading to reduced impact resistance and strength in the carbon fiber-reinforced composite material. The blending amount of the trifunctional or more epoxy resin is necessarily 40 to 80 mass %, preferably 50 to 70 mass % for 100 mass %, of total epoxy resin content.

Under the present invention, any epoxy resin other than [A'] and [B'], copolymer of an epoxy resin and thermosetting resin, and the like may also be contained. Examples of the thermosetting resin to be used through copolymerization with an epoxy resin include an unsaturated polyester resin, vinyl ester resin, epoxy resin, benzoxazine resin, phenol resin, urea resin, melamine resin, and polyimide resin. These resin compositions and compounds may be used singly or after blending as necessary. Blending in at least an epoxy resin other than [A'] and [B'] should improve both the fluidity of the resin and its heat resistance after curing. To improve the fluidity of the resin, an epoxy that is liquid at room temperature (25° C.) is preferably used. Here "liquid" means the following: A metal piece with a specific gravity of 7 or more, after being held at the same temperature as the thermosetting resin to be measured, is placed over the thermosetting resin. If the metal piece sinks instantly by gravity, the thermosetting resin is defined as liquid. Examples of a metal piece with a specific gravity of 7 or more include iron (steel), cast iron, and copper. Adding at least one type of liquid epoxy resin and at least one type of solid epoxy resin optimizes the tackiness and drapability of the prepreg. From the viewpoint of tackiness and drapability, the epoxy resin composition of the present invention preferably contains 20 mass % or more of liquid epoxy resins, including [A'] and [B'], for 100 mass % of total epoxy resin content.

Commercial products of the trifunctional or more epoxy resin [B'] include ELM434 (manufactured by Sumitomo Chemical Co., Ltd.), "Araldite (registered trademark)" MY720, "Araldite (registered trademark)" MY721, "Araldite (registered trademark)" MY9512 and "Araldite (registered trademark)" MY9663 (all manufactured by Huntsman Advanced Materials Gmbh), and "Epotohto (registered trademark)" YH-434 (manufactured by Nippon Steel Chemical Co., Ltd.) in terms of diaminodiphenyl methane-type epoxy resins. Commercial products of a meta-xylene diamine-type epoxy resin include TETRAD-X (manufactured by Mitsubishi Gas Chemical Co., Inc.).

Commercial products of a 1,3-bisaminomethyl cyclohexane-type epoxy resin include TETRAD-C (manufactured by Mitsubishi Gas Chemical Co., Inc.).

Commercial products of an isocyanurate-type epoxy resin include TEPIC-P (manufactured by Nissan Chemical Industries, Ltd.).

Commercial products of a tris-hydroxyphenyl methane-type epoxy resin include Tactix 742 (manufactured by Huntsman Advanced Materials Gmbh).

Commercial products of a tetraphenylol ethane-type epoxy resin include "jER (registered trademark)" 1031S (manufactured by Mitsubishi Chemical Corporation).

Commercial products of an aminophenol-type epoxy resin include ELM120 and ELM100 (both manufactured by Sumitomo Chemical Co., Ltd.), "jER (registered trademark)" 630 (manufactured by Mitsubishi Chemical Corporation), "Araldite (registered trademark)" MY0510 (manufactured by Huntsman Advanced Materials Gmbh), "Araldite (registered trademark)" MY0600 (manufactured by Huntsman Advanced Materials Gmbh), and "Araldite (registered trademark)" MY0610 (manufactured by Huntsman Advanced Materials Gmbh).

Commercial products of a phenol novolac-type epoxy resin include DEN431 and DEN438 (both manufactured by The Dow Chemical Company) and "jER (registered trademark)" 152 (manufactured by Mitsubishi Chemical Corporation).

Commercial products of an orthocresol novolac-type epoxy resin include EOCN-1020 (manufactured by Nippon Kayaku Co., Ltd.) and "Epicron (registered trademark)" N-660 (manufactured by DIC).

Commercial products of a dicyclopentadiene-type epoxy resin include "Epicron (registered trademark)" HP7200 (manufactured by DIC).

As an epoxy resin other than [A'] and [B'], a glycidyl ether-type epoxy resin, which has phenol as a precursor, is preferably used in terms of a difunctional epoxy resin. Examples of such an epoxy resin include a bisphenol A-type epoxy resin, bisphenol F-type epoxy resin, bisphenol S-type epoxy resin, naphthalene-type epoxy resin, biphenyl-type epoxy resin, urethane-modified epoxy resin, and hydantoin-type and resorcinol-type epoxy resins.

As a liquid bisphenol A-type epoxy resin, bisphenol F-type epoxy resin and resorcinol-type epoxy resin are low in viscosity, they are preferably used in combination with other epoxy resins.

A solid bisphenol A-type epoxy resin reduces heat resistance as it provides a low crosslink density structure compared to a liquid bisphenol A-type epoxy resin. Nevertheless, it is used in combination with a glycidyl amine-type epoxy resin, liquid bisphenol A-type epoxy resin or bisphenol F-type epoxy resin to obtain a structure consistent with higher toughness.

An epoxy resin with a naphthalene backbone provides a cured resin with low water absorbent and high heat resistance. A biphenyl-type epoxy resin, dicyclopentadiene-type epoxy resin, phenol aralkyl-type epoxy resin, and diphenyl fluorene-type epoxy resin also provide cured resins with low water absorbent and are therefore preferably used. A urethane-modified epoxy resin and isocyanate-modified epoxy resin provide a cure resin with high fracture toughness and extensibility.

Commercial products of a bisphenol A-type epoxy resin include "EPON (registered trademark)" 825 (manufactured by Mitsubishi Chemical Corporation), "Epicron (registered trademark)" 850 (manufactured by DIC), "Epotohto (registered trademark)" YD-128 (manufactured by Nippon Steel Chemical Co., Ltd.), and DER-331 and DER-332 (both manufactured by The Dow Chemical Company).

Commercial products of a bisphenol F-type epoxy resin include "jER (registered trademark)" 806, "jER (registered trademark)" 807 and "jER (registered trademark)" 1750 (all manufactured by Mitsubishi Chemical Corporation), "Epicron (registered trademark)" 830 (manufactured by DIC), and "Epotohto (registered trademark)" YD-170 (manufactured by Nippon Steel Chemical Co., Ltd.).

Commercial products of a resorcinol-type epoxy resin include "Denacol (registered trademark)" EX-201 (manufactured by Nagase ChemteX Corporation).

Commercial products of a glycidyl aniline-type epoxy resin include GAN and GOT (both manufactured by Nippon Kayaku Co., Ltd.).

Commercial products of a biphenyl-type epoxy resin include NC-3000 (manufactured by Nippon Kayaku Co., Ltd.).

Commercial products of a urethane-modified epoxy resin include AER4152 (manufactured by Asahi Kasei E-materials Corp.).

Commercial products of a hydantoin-type epoxy resin include AY238 (manufactured by Huntsman Advanced Materials Gmbh).

From the viewpoint of a balance between bonding with reinforcement fibers and mechanical/physical characteristics, the whole epoxy resin composition preferably contains 30 to 70 parts by weight, more preferably 40 to 60 parts by weight, of a glycidyl amine-type epoxy resin.

It is preferable that the epoxy resin composition for fiber-reinforced composite materials as proposed by the present invention contain a curing agent [C']. A curing agent as described here is a curing agent to be contained in the epoxy resin composition of the present invention, and comprises a compound having an active group capable of reacting with an epoxy group. Concrete examples of a curing agent include dicyandiamide, aromatic polyamine, aminobenzoic acid esters, various anhydrides, phenol novolac resins, cresol novolac resins, polyphenol compounds, imidazole derivatives, aliphatic amine, tetramethyl guanidine, thiourea addition amine, carboxylic anhydrides (e.g. methyl hexahydro phthalic anhydride), carboxylic acid hydrazides, carboxylic acid amides, polymercaptan, and Lewis acid complexes (e.g. boron trifluoride ethyl amine complex).

Using an aromatic polyamine as a curing agent makes it possible to obtain a hardened epoxy resin with excellent heat resistance. Of all aromatic polyamines, various isomers of diaminodiphenyl sulfone are most suited as curing agents in terms of obtaining hardened epoxy resins with excellent heat resistance.

Using a combination of dicyandiamide and a urea compound, e.g. 3,4-dichlorophenyl-1,1-dimethylurea or imidazole or its derivative as a curing agent makes it possible to obtain high heat resistance and water resistance despite curing at relatively low temperatures. Curing an epoxy resin using an anhydride provides a hardened material with lower water absorbent compared to curing with an amine compound. Using a slow-acting form of these curing agents, such as microcapsulized agents, improves the storage stability of prepregs, so much so that their tackiness and drapability tend to resist change even if left at room temperature.

The optimum amount of a curing agent to be added differs according to the types of the epoxy resin and curing agent. With an aromatic amine curing agent, for instance, it is preferable to add a stoichiometrically equivalent amount but setting the ratio of the amount of active hydrogen in an aromatic amine curing agent to the amount of epoxy groups in the epoxy resin at around 0.7 to 0.9 sometimes provides a resin with a higher modulus of elasticity compared to an equivalent amount, making it another preferred embodiment, These curing agents may be used singly or in combinations of two or more.

Commercial products of an aromatic polyamine curing agent include Seikacure S (manufactured by Wakayama Seika Kogyo Co., Ltd.), MDA-220 (manufactured by Mitsui Chemicals, Inc.), "jER Cure (registered trademark)" W (manufactured by Mitsubishi Chemical Corporation), 3,3'-DAS (manufactured by Mitsui Chemicals, Inc.), Lonzacure (registered trademark) M-DEA (manufactured by Lonza Group Ltd.), Lonzacure (registered trademark) M-DIPA (manufactured by Lonza Group Ltd.), Lonzacure (registered trademark) M-MIPA (manufactured by Lonza Group Ltd.), and Lonzacure (registered trademark) DETDA 80 (manufactured by Lonza Group Ltd.).

It is also possible to have the whole or part of the epoxy resin and curing agent undergo a preliminary reaction and add the resulting mixture into the composition. This method is sometimes effective in the adjustment of viscosity or improvement of storage stability.

The epoxy resin composition for fiber-reinforced composite materials as proposed by the present invention needs to contain an elastomer component [D']. This elastomer component [D'] is a polymer material with a domain in which the glass transition temperature is lower than 20° C., and examples include liquid rubber, solid rubber, crosslinked rubber particles, core-shell rubber particles, thermoplasticity elastomer, and a block copolymer containing a block whose glass transition temperature is lower than 20° C. The elastomer component [D'] is blended in with the aim of forming a fine elastomer phase within the epoxy matrix phase after curing. This makes it possible to eliminate the plane strain generated in the hardened resin material upon imposition of a mode-I stress load through the transformation of the elastomer phase into collapsed bubbles (cavitation) and causes the absorption of a large amount of energy by inducing plastic deformation in the epoxy matrix phase, thus leading to an improvement in the mode-I interlaminar toughness of the fiber-reinforced composite material.

It is preferable that the elastomer component [D'] comprises at least one member of a set comprising a block copolymer containing a block whose glass transition temperature is lower than 20° C. and core-shell rubber particles. This makes it possible to introduce a fine elastomer phase while minimizing the dissolving of the elastomer component into the epoxy resin, leading to a dramatic improvement in the mode-I interlaminar toughness of the fiber-reinforced composite material without reducing the reduction in heat resistance and the modulus of elasticity.

In particular, the use of such an elastomer component [D'] in combination with an epoxy resin [A'] having at least one of an amine type glycidyl group or ether type glycidyl group directly bonded to the ring structure, an at least trifunctional epoxy resin [B'] and a curing agent [C'] introduces an elastomer phase into an epoxy matrix phase with a moderately low crosslink density and causes a large plastic deformation to the epoxy matrix phase through the elimination of plane strain, resulting in a dramatic improvement in mode-I interlaminar toughness. Consequently, the blending amount of the elastomer component can be kept low, thus minimizing negative side effects, such as an increase in the viscosity of the epoxy resin composition, reduction in the modulus of elasticity of the hardened resin material and a reduction in heat resistance.

A block copolymer containing a block whose glass transition temperature is 20° C. or less is subject to no particular limit as to its chemical structure, molecular weight and the like, but it is preferable that the block whose glass transition temperature is 20° C. or less be incompatible with an epoxy resin and that a block that dissolves in an epoxy resin also be contained.

As rubber particles, crosslinked rubber particles and core-shell rubber particles, produced by growing a dissimilar polymer on the surface of crosslinked rubber particles through graft polymerization, are advantageously used from the viewpoint of ease of handling, etc. The primary particle diameter of rubber particles is preferably in the 50 to 300 μm range, and more preferably in the 80 to 200 μm range. In addition, it is preferable that such rubber particles have excellent affinity with an epoxy resin and be incapable of causing secondary coagulation during resin preparation or molding/curing.

Commercially available products of crosslinked rubber particles include FX501P (manufactured by Japan Synthetic Rubber Co., Ltd.), which comprises a crosslinked product of a carboxyl-modified butadiene-acrylonitrile copolymer, CX-MN series (manufactured by Nippon Shokubai Co., Ltd.), which comprises acrylic rubber fine particles, and YR-500 series (manufactured by Nippon Steel Chemical Co., Ltd.).

Commercially available products of core-shell rubber particles include "Paraloid (registered trademark)" EXL-2655 (Kureha Chemical Industry Co., Ltd., which comprises a copolymerization product of butadiene, methacrylic acid alkyl and styrene, "Stafiloid (registered trademark)" AC-3355 and TR-2122 (Takeda Pharmaceutical Co., Ltd.), which comprises a copolymerization product of acrylate and methacrylate, "PARALOID (registered trademark)" EXL-2611 and EXL-3387 (Rohm and Haas Co.), which comprises a copolymerization product of butyl acrylate and methyl methacrylate, and "Kane Ace (registered trademark)" MX series (Kaneka Corp.).

It is also preferable that such an elastomer component [D'] be at least one block copolymer chosen from the group consisting of S—B-M, B-M and M-B-M (hereinafter also referred to simply as "a block copolymer". This makes it possible to improve mode-I interlaminar toughness while maintaining the excellent heat resistance of the fiber-reinforced composite material.

Each of the blocks denoted with the letters S, B, and, M is connected to the other by means of a covalent bond or of an intermediate molecule connected to one of the blocks via a covalent bond and to the other block via another covalent bond.

Block M comprises a copolymer containing at least 50 mass % of a homopolymer of polymethyl methacrylate or methyl methacrylate.

Block B is incompatible with block M and has a glass transition (hereafter also referred to simply as "Tg") temperature of 20° C./or less.

The glass transition temperature Tg of block B can be measured using the DMA method based on an RSAII (manufactured by Rheometrics, Inc.) whether it is the epoxy resin composition as a whole or a single block copolymer. Namely, a plate-shaped 1×2.5×34-mm specimen is measured using the DMA method as it is subjected to a driving frequency of 1 Hz over a temperature range of −60 to 250° C., with the glass transition temperature Tg found as the value of tan δ. Here, the specimen is prepared in the manner described as follows: When the specimen is an epoxy resin composition, an uncured resin composition is defoamed in a vacuum, and then cured at a temperature of 130° C. for two hours inside a mold set for a thickness of 1 mm using a 1 mm-thick Teflon (registered trademark) to obtain a void-free plate-shaped hardened material. In the case of a single block copolymer, a similarly void-free plate can be obtained using a biaxial extrusion machine. Such a plate is then cut to the size using a diamond cutter and evaluated.

Block S is incompatible with blocks B and M, and its glass transition temperature Tg is higher than that of block B.

It is preferable that any of blocks S, B and M in the case of an S—B-M block copolymer and either of blocks B and M in the case of a B-M or M-B-M block copolymer be compatible with the epoxy resin from the viewpoint of improving toughness.

The blending amount of this elastomer component [D'] is preferably 2 to 15 parts by weight, more preferably 3 to 10 parts by weight and ideally 4 to 8 parts by weight, for 100 parts by weight of total epoxy resin content from the viewpoint of mechanical characteristics and amenable to the composite production process. If the blending amount falls below one part by weight, the toughness and plastic deformation capacity of the hardened material will be reduced, leading to a low impact resistance of the fiber-reinforced composite material obtained. If the blending amount exceeds 10 parts by weight, the modulus of elasticity of the hardened material falls dramatically, leading to a significant reduction in the static strength characteristics of the fiber-reinforced composite material obtained, combined with a tendency for the fiber-reinforced composite material to contain voids due to inadequate resin flows at the molding temperature.

A monomer other than methyl methacrylate may be advantageously introduced into said block M as a copolymerization component from the viewpoint of compatibility with an epoxy resin and control of the various characteristics of the hardened material. No specific limits apply to such a monomeric copolymerization component, and any choice can be made as appropriate. However, to ensure compatibility with an epoxy resin having a high SP value, monomers with higher SP values than methyl methacrylate, particularly water-soluble monomers, are preferably used.

Of all such monomers, acrylamide derivatives, particularly dimethyl acrylamide, are advantageously used. Reactive monomers are also applicable.

Here, SP stands for solubility parameter, which is a well-known index of solubility and compatibility. There are two ways of obtaining an SP value: calculation from physical properties, such as the heat of evaporation, and estimation from the molecular structure. Here, SP values calculated from molecular structures on the basis of the Fedors method, as described in Polym. Eng. Sci., 14(2), 147-154 (1974), are used. The unit of measurement is $(cal/cm3)^{1/2}$.

A reactive monomer means a monomer having a functional group capable of reacting with any oxirane group contained in an epoxy molecule or any functional group contained in a curing agent. Examples include monomers having an oxirane group, amine group, carboxyl group, or any other reactive functional group, though they do not represent the limits. It is also possible to use a (meth)acrylic acid (a term used to commonly refer to both a methacrylic acid and acrylic acid in the present Description) or a monomer capable of producing a (meth)acrylic acid through hydrolytic reaction as a reactive monomer. A reactive monomer is preferably used as it improves compatibility with epoxy resins as well as the bonding at the epoxy-block copolymer interface.

Other examples of a monomer suited to constitute block M include glycidyl methacrylate and tert-butyl methacrylate. At any rate, it is preferable that at least 60% of block M comprise syndiotactic PMMA (polymethyl methacrylate).

The glass transition temperature Tg of block B needs to be 20° C. or less, preferably 0° C. or less, more preferably −40° C. or less. As far as toughness is concerned, the lower the glass transition temperature Tg, the more preferable, but if it falls below −100° C., problems with processability, such as a rough cutting surface on the fiber-reinforced composite material, may arise.

It is preferable that block B be an elastomer block, and the monomer used to synthesize such an elastomer block is preferably a diene selected from butadiene, isoprene, 2,3-dimethyl-1,3-butadiene, 1,3-pentadiene, and 2-phenyl-1,3-butadiene. It is particularly preferable that one be selected from polybutadiene, polyisoprene, random copolymers thereof and partial or fully hydrogenated polydienes from the viewpoint of toughness. Of all polybutadienes, 1,2-polybutadiene (Tg: approx. 0° C.) and the like may be chosen, but it is more preferable to use choices found in the lowest range of glass transition temperatures Tg, such as 1,4-polybutadiene (Tg: approx. −90° C.). This is because it is advantageous to use block B with the lowest possible glass transition temperature Tg from the viewpoint of impact resistance and toughness. Block B may be hydrogenated. Such hydrogenation is carried out by the usual method.

As the monomer constituting block B, alkyl (meth)acrylate is also preferable. Concrete examples include ethyl acrylate (−24° C.), butyl acrylate (−54° C.), 2-ethylhexyl acrylate (−85° C.), hydroxyethyl acrylate (−15° C.), and 2-ethylhexyl meta-acrylate (−10° C.). Here, the figure shown in brackets following the name of each acrylate is the glass transition temperature Tg of block B when that arylate is used. Of those arylates, it is preferable to use butyl acrylate. These acrylate monomers are incompatible with a block M acrylate containing at least 50 mass % of methyl methacrylate.

Of these choices, it is preferable that block B comprise a polymer selected from 1,4-polybutadiene, polybutyl acrylate, and poly(2-ethylhexyl acrylate).

When triblock copolymer S-B-M is used as the block copolymer, block S is incompatible with block B and M, and its glass transition temperature Tg is higher than that of block B. The Tg or melting point of block S is preferably 23° C. or more, more preferably 50° C. or more. Block S may be based on, for instance, an aromatic vinyl compound, such as styrene, α-methyl styrene or vinyl toluene, or alkyl acid having an alkyl chain containing one to 18 carbon atoms and/or alkyl ester of methacrylic acid. Block S obtained from alkyl acid having an alkyl chain containing one to 18 carbon atoms and/or an alkyl ester of methacrylic acid is incompatible with block M containing at least 50 mass % of methyl methacrylate.

When using triblock copolymer M-B-M as the block copolymer, the two block Ms in the triblock copolymer M-B-M may be identical or different. They can be based on the same monomer but with different molecular weights.

When using triblock copolymer M-B-M and diblock copolymer B-M in combination as the block copolymer, block Ms in the triblock copolymer M-B-M and block M in diblock copolymer B-M may be identical or different, while block B in triblock copolymer M-B-M and block B in diblock copolymer B-M may be identical or different.

When using triblock copolymer S-B-M, diblock copolymer B-M and/or triblock copolymer M-B-M in combination as the block copolymer, block M in triblock copolymer S-B-M, block Ms in triblock copolymer M-B-M and block M in diblock copolymer B-M may be identical or different. Similarly, block Bs in triblock copolymer S-B-M, triblock copolymer M-B-M, and diblock copolymer B-M may be identical or different.

Block copolymers may be produced through anionic polymerization. For instance, methods described in European Patent No. EP 524,054, Official Gazette, and European Patent No. EP 749,987, Official Gazette, may be used for their production.

Concrete examples of triblock copolymer S-B-M include Nanostrength 123, Nanostrength 250, Nanostrength 012, Nanostrength E20, and Nanostrength E40, all manufactured by Arkema K.K, in teems of a styrene-butadiene-methyl methacrylate copolymer. Concrete examples of a triblock copolymer M-B-M include Nanostrength M22, manufactured by Arkema K.K., and Nanostrength M22N and Nanostrength SM4032XM10, both developed by Arkema K.K on the basis of said Nanostrength M22 through copolymerization with a monomer having a high SP value, in terms of a methyl methacrylate-butyl acrylate-methyl methacrylate copolymer. Of these, Nanostrength M22N and Nanostrength SM4032XM10, both produced through copolymerization with a monomer having a high SP value, are particularly advantageously used as they develop a fine phase separation structure and provide high toughness.

Under the present invention, using a thermoplastic resin by mixing it with or dissolving it into the epoxy resin composition is also a preferred embodiment. It is generally preferable that such a thermoplastic resin have, in its backbone chain, a bond chosen from the group consisting of a carbon-carbon bond, amide bond, imide bond, ester bond, ether bond, carbonate bond, urethane bond, thioether bond, sulfone bond, and carbonyl bond. This thermoplastic resin could have a partially crosslinked structure to no detriment, and may either be crystalline or amorphous. It is preferable that at least one type of resin chosen from the group consisting of polyamide, polycarbonate, polyacetal, polyphenylene oxide, polyphenylene sulfide, polyallylate, polyester, polyamide-imide, polyimide, polyetherimide, polyimide with a phenyl trimethyl indane structure, polysulfone, polyethersulfone, polyether ketone, polyether ether ketone, polyaramid, polyether nitrile and polybenz imidazole be mixed with or dissolved into any of the epoxy resins contained in the epoxy resin composition (This thermoplastic resin is referred to as the "thermoplastic resin [F']".).

To obtain excellent heat resistance, the glass transition temperature (Tg) of thermoplastic resin needs to be at least 150° C. or more, preferably 170° C. or more. If the glass transition temperature of thermoplastic resin to be blended in is less than 150° C., the tendency towards thermal deformation sometimes increases when used as a molded material. As the terminal functional group of this thermoplastic resin, hydroxyl group, carboxyl group, thiol group, anhydride, and the like are preferably used for their ability to react with a cationic polymerization compound. In concrete terms, commercial products of polyethersulfone., such as "Sumikaexcel (registered trademark)" PES3600P "Sumikaexcel (registered trademark)" PES5003P, "Sumikaexcel (registered trademark)" PES5200P, and "Sumikaexcel (registered trademark)" PES7600P (all manufactured by Sumitomo Chemical Co., Ltd.), "Ultrason (registered trademark)" E2020P SR and "Ultrason (registered trademark)" E2021 SR (both manufactured by BASF), and "GAFONE (registered trademark)" 3600RP and "GAFONE (registered trademark)" 3000RP (both manufactured by Solvay Advanced Polymers), are available for use. Other examples include a copolymer oligomer of polyethersulfone and polyether ether sulfone as described in the Published Japanese Translation of PCT International Publication No. JP 2004-506789, Official Gazette, as well as commercial products of polyetherimide, such as "Ultem (registered trademark)" 1000, "Ultem (registered trademark)" 1010 and "Ultem (registered trademark)" 1040 (all manufactured by Solvay Advanced Polymers K.K. polymers). An oligomer refers to a relatively low molecular weight polymer in which a finite number of monomers, ranging from some 10 to 100, are bonded.

A mixture of an epoxy resin and thermoplastic resin often produces better results than using each ingredient singly. It provides a balanced base resin that makes up for the brittleness of an epoxy resin with the toughness of a thermoplastic resin and the molding difficulty of a thermoplastic resin with the moldability of an epoxy resin. The blending ratio (mass %) between the epoxy resin and thermoplastic resin is preferably in the 2 to 40 mass %, more preferably in the 5 to 30 mass % range, for 100 mass % of total epoxy resin content from the viewpoint of balance With the epoxy resin composition for fiber-reinforced composite materials as proposed by the present invention, it is preferable to first uniformly heat and knead all the ingredients (components) other than the curing agent [C'] keeping them at 150 to 170° C. and then cool them down to around to 60° C., followed by the addition of the curing agent [C'] and kneading, though the ingredient blending methods are not limited to this.

Under the present invention, it is also preferable to blend thermoplastic resin particles [E'] into the epoxy resin composition of the present invention. The introduction of thermoplastic resin particles improves the toughness of the matrix resin and the impact resistance of the carbon fiber-reinforced composite material as the final product.

As raw material for thermoplastic resin particles used under the present invention, the same thermoplastic resins as those described earlier as thermoplastic resins that can be used by mixing with or dissolving into an epoxy resin composition may be used. Of them, polyamides are most preferable, especially nylon 12, nylon 11 and the nylon 6/12 copolymer as these polyamides provide excellent bonding strength with a thermosetting resin. The shape of these thermoplastic resin particles may be spherical, non-spherical or porous, but spherical particles are the preferred embodiment because of their excellent viscoelasticity, derived from not reducing the flow characteristics of the resin, and the high impact resistance they provide by eliminating the starting point of stress concentration. Commercial products of polyamide particles include SP-500 (manufactured by Toray Industries, Inc.), Toraypearl (registered trademark) TN (manufactured by Toray Industries, Inc.), "Orgasol (registered trademark)" 1002D (manufactured by ATOCHEM), "Orgasol (registered trademark)" 2002 (manufactured by ATOCHEM), "Orgasol (registered trademark)" 3202 (manufactured by ATOCHEM), and Trogamid T5000.

The epoxy resin composition of the present invention may, to the extent that all the effects described in the "Effect of the present invention" section can be maintained, contain a coupling agent, thermosetting resin particles, a thermoplastic resin dissolvable in an epoxy resin, and inorganic fillers such as silica gel, carbon black, clay, carbon nanotube, and metal powder.

As described above, resin compositions with a high glass transition point Tg generally have a high curing temperature, and such resin compositions tend to contain large amounts of matter that becomes volatile during the curing time. The presence of large amounts of matter that becomes volatile during the curing time may, for instance, cause the formation of voids during the molding process of the prepreg laminate, leading to a reduction in strength in the fiber-reinforced composite material as the end product. Vaporized organic compounds also present a problem in terms of the safety of the work environment.

The volatilization rate of an epoxy resin composition tends to increase in proportion with the rise in the exposure temperature. However, the higher the temperature becomes, the quicker the epoxy resin composition turns into a gel and stops producing volatile components, so that, in many cases, volatilization rate peaks out at or below the curing temperature. For instance, an aromatic polyamine-based composition, which requires high temperature conditions for curing, the volatilization rate hits the plateau at temperatures of 150 to 180° C., though it depends on the heating rate. In cases where curing occurs at 180° C., for instance, it is preferable to measure the volatilization rate at 160° C., where the influence of the heating rate is small.

For this reason, to obtain high heat resistance while minimizing the generation of voids during the molding of a fiber-reinforced composite material, it is preferable to keep the volatilization rate low during heat exposure. In concrete terms, it is preferable that, when leaving a prepreg in a hot air drier for 20 minutes, the volatilization rate be 0.2 to 5% or less, more preferably 0.02 to 3% or less.

Reinforcement fibers available for the preparation of prepregs under the present invention include carbon fiber, glass fiber, aramid fiber, boron fiber, PBO fiber, high strength polyethylene fiber, alumina fiber, and silicon carbide fiber. These fibers may be used by mixing two or more. There are no restrictions on the form or configuration of reinforcement fibers, and fibers with diverse structures may be used, including, for instance, long fibers (drawn in one direction), single tow, woven fabrics, knits, nonwoven fabrics, mats, and plaits.

In applications where materials are subject to particularly stringent lightweight and high strength requirements, carbon fiber is preferably used for its excellent specific modulus of elasticity and specific strength.

Although all kinds of carbon fibers may be used under the present invention according to a given application, they preferably have a tensile modulus of up to 400 GPa from the viewpoint of impact resistance. From the viewpoint of strength, carbon fibers with a tensile strength of 4.4 to 6.5 GPa are preferably used as they provide high rigidity and high mechanical strength composite materials. With tensile elongation being another important element, it is preferable that high strength high extensibility carbon fibers with a tensile elongation rate of 1.7 to 2.3% be used. The most desirable carbon fiber is, therefore, one that combines these characteristics: a tensile modulus of at least 230 GPa, a tensile strength of at least 4.4 GPa, and a tensile elongation rate of at least 1.7%.

Commercial products of carbon fibers include "Torayca (registered trademark)" T800G-24K, "Torayca (registered trademark)" T800S-24K, "Torayca (registered trademark)" T700G-24K, "Torayca (registered trademark)" T300-3K, and "Torayca (registered trademark)" T700S-12K (all manufactured by Toray Industries, Inc.).

In terms of form and configuration, carbon fibers may be selected from long fibers (drawn in one direction), woven fabrics and other varieties as appropriate, but to obtain high-standard lightweight and durable carbon fiber-reinforced composite materials, it is preferable that carbon fibers be of a continuous fiber form, including long fibers (bundles) and woven fabrics.

Carbon fiber bundles used under the present invention preferably have a monofilament fineness of 0.2 to 2.0 dtex, more preferably 0.4 to 1.8 dtex. If monofilament fineness is less than 0.2 dtex, carbon fiber bundles are susceptible to damage during twining due to contact with guide rollers, with similar damage also possible at the resin composition impregnation treatment step. If monofilament fineness exceeds 2.0 dtex, a resin composition sometimes fails to sufficiently penetrate carbon fiber bundles, resulting in low fatigue resistance.

It is preferable that the number of filaments per bundle of carbon fiber bundles used under the present invention be in the 2500 to 50,000 range. If the number of filaments falls below 2500, the laid-out fibers tend to snake, causing a reduction in strength. If the number of filaments exceeds 50,000, it may be difficult to have resin penetrate during prepreg preparation or molding. The number of filaments is more preferably in the 2800 to 40000 range.

The prepreg of the present invention is produced by impregnating the reinforcement fibers with the epoxy resin composition. Such a prepreg preferably has a fiber mass fraction of 40 to 90 mass % and more preferably 50 to 80 mass %. If the fiber mass fraction is too low, the composite material becomes too heavy, and this may undermine the advantage of a fiber-reinforced composite material in terms of its excellent specific strength and specific modulus of elasticity. If the fiber mass fraction is too high, impregnation with a resin composition tends to be unsatisfactory, leading to a dramatic reduction in mechanical characteristics of the composite material due to the formation of a large number of voids.

It is preferable that the prepreg of the present invention have a structure in which a particle-rich layer, namely, a layer characterized by the clearly verifiable localized presence of said thermoplastic resin particles [E'] (hereinafter, also referred to simply as "particle layer"), is found to have formed near the surface of the prepreg when its cross section is observed.

When such a material is produced by laminating prepregs and curing the epoxy resin, this kind of structure facilitates the formation of a resin layer between prepreg layers, i.e. layers within a carbon fiber-reinforced composite material and enhances the interlaminar bonding and adhesion of the composite material, thus allowing high impact resistance to develop in the carbon fiber-reinforced composite material.

From this viewpoint, it is preferable that the particle layer be present within the surface 20% range, more preferably within the surface 10% range, of the 100% thickness of a prepreg. Although a particle layer may be present just on one side, care should be taken as this would create front and rear sides on the prepreg. If a mistake is made in the lamination of prepregs by allowing the presence of interlaminar regions with and without particles alongside each other, a composite material with low impact strength results. To eliminated the distinction between the front and rear sides and simplify the lamination process, it is preferable to have a particle layer on both sides of a prepreg.

The proportion of thermoplastic resin particles present in the particle layer is preferably 90 to 100 mass %, more preferably 95 to 100 mass %, of all thermoplastic resin particles present (100 mass %) in the prepreg.

This proportion may be evaluated, for instance, using the method described as follows: Namely, held between two smooth-surfaced polytetrafluoroethylene resin plates in close contact, a prepreg is turned into a gel and cured over seven days by gradually raising the temperature to the curing temperature, thus producing a plate-like hardened material out of the prepreg. Then, with both sides of the hardened material, a line parallel to the surface is drawn at 20% of depth in the thickness direction. Next, the total area of particles present between the surface and the line and the total area of particles present across the entire thickness of the hardened material are found, followed by the calculation of the proportion of particles present within 20% of depth into the 100% thickness of the material. Here, the total area of particles is determined by gouging out parts of the cross-sectional photograph containing particles and converting their combined mass. If it is difficult to identify particles dispersed across the resin from a photograph, a suitable method to dye the particles may be adopted.

The prepreg of the present invention may be produced using methods disclosed in Japanese Published Unexamined Application (Tokkai) No. HEI-1-26651, Official Gazette, Japanese Published Unexamined Application (Tokkai) No. SHO 63-170427, Official Gazette, and Japanese Published Unexamined Application (Tokkai) No. SHO 63-170428, Official Gazette, with any necessary modifications. In concrete terms, the prepreg of the present invention may be produced typically using one of the following methods: coating the surface of the primary prepreg comprising carbon fibers and an epoxy resin with thermoplastic resin particles in particle form; preparing a mixture by uniformly mixing such particles into an epoxy resin as a matrix resin and, during the impregnation of the carbon fibers with this mixture, blocking the intrusion of particles with the carbon fibers to localize the presence of particles within the prepreg surface region; and preparing a primary prepreg in advance by impregnating the carbon fibers with an epoxy resin and affixing a thermosetting resin film containing these particles in high concentrations over the surface of the primary prepreg. Ensuring a uniform presence of thermoplastic resin particles within 20% depth into the thickness within 20% depth into the thickness of the prepreg makes it possible to obtain a prepreg for fiber composite materials with high impact resistance.

The prepreg of the present invention may be advantageously prepared using the wet method, which dissolves the epoxy resin composition of the present invention in a solvent, such as methyl ethyl ketone or methanol, to lower its viscosity and impregnates reinforcement fibers with it, the hot melt method, which heats the epoxy resin composition to lower its viscosity and impregnates the reinforcement fibers with it, or the like.

With the wet method, reinforcement fibers are first immersed in a solution of an epoxy resin composition as a matrix resin and retrieved, and then the solvent is removed through evaporation using an oven, etc.

The hot-melt method may be implemented by impregnating reinforcement fibers directly with an epoxy resin composition, made fluid by heating in advance, or by first coating a piece or pieces of release paper or the like with an epoxy resin composition for use as resin film and then placing a film over one or both side(s) of reinforcement fibers as configured into a flat shape, followed by the application of heat and pressure to impregnate the reinforcement fibers with resin. The hot-melt method is preferable in the present invention as the prepreg has virtually no residual solvent in it.

Fiber-reinforced composite materials of the present invention are produced using methods such as the lamination of obtained prepregs, followed by curing of the resin through a simultaneous application of heat and of pressure to the laminate.

Here, methods for a simultaneous application of heat and pressure encompass, among other things, press forming, autoclave forming, bag forming, wrapping tape, and internal pressure forming. For the molding of sporting goods, in particular, the wrapping tape method and internal pressure forming methods are preferably used.

The wrapping tape method is used to form a fiber-reinforced composite material into a tubular body by wrapping prepregs around a cored bar, such as a mandrel, and is suited to produce rod-shaped products, such as golf shafts and fishing rods. In more concrete terms, the wrapping tape method involves the wrapping of prepregs around a mandrel, wrapping of wrapping tape made of thermoplastic film over the prepregs for the purpose of securing the prepregs and applying pressure to them, curing of the resin through heating inside an oven, and removal of the cored bar to obtain the tubular body.

The internal pressure forming method is designed to form prepregs by first wrapping them around a thermoplastic resin tube or other internal pressure applicator to obtain a preform, setting the preform inside a metal mold, and applying pressure to the internal pressure applicator through the introduction of high pressure gas, as the mold is heated. This method may preferably be used when forming objects with complex shapes, such as golf shafts, bats, and tennis or badminton rackets.

The carbon fiber-reinforced composite material of the present invention may be produced by means of, for instance, a method in which the prepregs of the present invention are laminated into a predetermined form and simultaneously compressed and heated to cure the epoxy resin.

The fiber-reinforced composite material of the present invention may also be produced using the epoxy resin composition by means of a method that does not have a prepreg preparation step.

Examples of such a method, i.e. a method based on a direct reinforcement fiber impregnation with an epoxy resin composition of the present invention followed by thermal curing, include the hand lay-up method, filament winding method, pultrusion method, resin injection molding method, resin transfer molding method, and other molding methods. With these methods, it is preferable that an epoxy resin composition be prepared immediately before use by mixing at least one base resin, which comprises epoxy resins, and at least one curing agent.

WORKING EXAMPLES

The first preferred embodiment of the present invention relating to an epoxy resin composition is now described in more detail by way of a working example. The resin ingredient preparation methods and evaluation methods used in the working example are shown below.

<Epoxy Resin>
Amine-type Epoxy Resin [A]
(Difunctional-Type Epoxy Resin)

N,N-diglycidyl-4-phenoxy aniline synthesized using the method described below

After placing 610.6 g (6.6 mol) of epichlorohydrin in a four-necked flask fitted with a thermometer, dropping funnel, cooling pipe and stirrer, the temperature was raised to 70° C. while performing a nitrogen purge, and 203.7 g (1.1 mol) of p-phenoxy aniline, dissolved into 1020 g of ethanol, was dropped over four hours. It was stirred for a further six hours to complete the addition reaction, and 4-phenoxy-N,N-bis(2-hydroxy-3-chloropropyl)aniline resulted. After lowering the temperature inside the flask to 25° C., 229 g (2.75 mol) of a 48% aqueous solution of NaOH was dropped over two hours, followed by another hour of stirring. After the completion of cyclization reaction, ethanol was removed through evaporation, and extraction was performed using 408 g of toluene, followed by two lots of washing using a 5% saline solution. After removing toluene and epichlorohydrin from the organic layer under reduced pressure, 308.5 g (yield 94.5%) of a brown-colored viscous liquid was obtained. The purity of the main product, N,N-diglycidyl-4-phenoxy aniline, was 91% (GCArea %).

(Polyfunctional-type Epoxy Resin)

ELM434 (tetraglycidyl diaminodiphenyl methane, manufactured by Sumitomo Chemical Co., Ltd.)

"jER (registered trademark)" 630 (triglycidyl-p-aminophenol, manufactured by Mitsubishi Chemical Corporation).

(Epoxy Resin Other than [A])

"EPON (registered trademark)" 825 (bisphenol A-type epoxy resin, manufactured by Mitsubishi Chemical Corporation)

"jER (registered trademark)" 4007P (bisphenol F-type epoxy resin, manufactured by Mitsubishi Chemical Corporation)

"jER (registered trademark)" 152 (phenol novolac-type epoxy resin, manufactured by Mitsubishi Chemical Corporation).

(Other Components)

"Toraypearl (registered trademark)" TN (manufactured by Toray Industries, Inc., average particle diameter: 13.0 μm).

<Aromatic Amine Curing Agent [B]>

"Seikacure (registered trademark)"-S (4,4'-diaminodiphenyl sulfone, manufactured by Wakayama Seika Kogyo Co., Ltd.)

3,3'-DAS (3,3'-diaminodiphenyl sulfone, manufactured by Mitsui Fine Chemical, Inc.).

<Block Copolymer [C], Etc.>
(Block Copolymer [C] Having Reactive Group Capable of Reacting with Epoxy Resin)

"Nanostrength (registered trademark)" SM4032XM10 (M-B-M block copolymer [C] where B is butyl acrylate (Tg: −54° C.) and M comprises random copolymer chains of methyl methacrylate and acrylic monomer containing carboxyl group, manufactured by Arkema K.K.)

(Block Copolymer not Containing Reactive Group Capable of Reacting with Epoxy Resin)

"Nanostrength (registered trademark)" M22N (M-B-M block copolymer where B is butyl acrylate (Tg: −54° C.) and M comprises random copolymer chains of methyl methacrylate and polar acrylic monomer, manufactured by Arkema K.K).

(MMA-GMA)-EHMA {poly(methyl methacrylate-ran-glycidylmethacrylate)-block-poly (2-ethylhexyl methacrylate), (MMA-GMA) block weight fraction=0.22, mole fraction of glycidylmethacrylate in (MMA-GMA) block=0.4, Mn=25,500 g/mole}

Synthesized according to description given in "Methacrylate Block Copolymers through Metal-Mediated Living Free-Radical Polymerization for Modification of Thermosetting Epoxy" by R. B. Grubbs, J. M. Dean and F. S. Bates in "Macromolecules", Vol. 34, p. 8593 (2001).

(MA-AA)-BA {poly(methyl acrylate-ran-acrylic acid)-block-poly(butyl acrylate), (MA-AA) block weight fraction=0.24, mole fraction of acrylic acid in (MA-AA) block=0.05, Mn=78,100 g/moles}

A living first block of poly(methyl acrylate-ran-acrylic acid) was prepared using the alkoxy amine BlocBuilder (iBA-DEPN). iBA-DEPN was added to a mixture of methyl acrylate and acrylic acid and heated at 110 to 120° C. in a nitrogen atmosphere, with polymerization allowed to progress to a conversion rate of 60 to 90%. This polymerization product was diluted with a butyl acrylate monomer, and the residual methyl acrylate was removed through vaporization in a vacuum at 50 to 60° C. Toluene was added, and the mixture was heated at 110 to 120° C. in a nitrogen atmosphere, with a second block allowed to polymerize to a conversion rate of 60 to 90%. The solvent and residual monomer was removed under vacuum, and a block copolymer was obtained.

(1) Preparation of Epoxy Resin Composition

Prescribed amounts of all the components other than the curing agent and curing accelerator were placed in a kneader, and the mixture was heated to 160° C. while being kneaded, followed by an hour of kneading at 160° C., which produced a transparent viscous liquid. After letting it cool down to 80° C. while kneading was provided, prescribed amounts of the curing agent and curing accelerator were added, followed by further kneading, and an epoxy resin composition was obtained.

(2) Measurement of Bending Modulus of Elasticity of Hardened Resin Material

After defoaming under vacuum, the epoxy resin composition prepared in (1) was injected into a mold set for a thickness of 2 mm using a 2 mm-thick Teflon (registered trademark) spacer. It was cured for 2 hours at a temperature of 180° C. to obtain a 2 mm-thick hardened resin material. A specimen measuring 10 mm wide and 60 mm long was then cut from the obtained hardened resin material plate and subjected to a three-point bend test at a bending span of 32 mm, with the bending modulus of elasticity found in accordance with JIS K7171-1994.

(3) Measurement of Toughness (KIC) of Hardened Resin Material

After defoaming under vacuum, the epoxy resin composition prepared in (1) was cured at 180° C./for 2 hours inside a mold set for a thickness of 6 mm using a 6 mm-thick Teflon (registered trademark) spacer to obtain a 6 mm-thick hardened resin material. This hardened resin material was cut to a 12.7×150 mm size to obtain a specimen. The specimen was processed and tested using an Instron universal testing machine (made by Instron) in accordance with ASTEM D5045 (1999). The introduction of an initial crack into the specimen was performed by placing a razor blade cooled down to liquid nitrogen temperature against the specimen and hitting the back of the blade with a hammer to apply an impact force. Here, the toughness of a hardened resin material refers to critical stress in deformation mode I (open mode).

(4) Measurement of Glass Transition Temperature of Hardened Resin Material

A 7-mg sample was taken out of the hardened resin material plate prepared in (2) above and subjected to measurements using model No. DSC2910 manufactured by TA Instruments as the temperature was increased at a rate of 10° C./min over the temperature range of 30° C. to 350° C. The midpoint temperature determined in accordance with JIS K7121-1987 was defined as the glass transition temperature Tg, and heat resistance was evaluated.

(5) Measurement of Phase Separation Structure Size

After defoaming under vacuum, the epoxy resin composition prepared in (1) was heated at a rate of 1.5° C./min over the temperature range of 30° C. to 180° C. and then cured at 180° C. for 2 hours, and this produced a hardened resin material. After dying, the hardened resin material was cut into thin slices, and transmission electron images were taken of them using a transmission electron microscope (TEM) under the conditions specified below. As dyeing agents, OsO4 and RuO4 were alternately used according to resin composition, to ensure that the morphology is contrasted well.

Equipment: H-7100 Transmission electron microscope (manufactured by Hitachi, Ltd.)
Accelerating voltage: 100 kV
Magnification: ×10,000.

In this manner, the structure interval between the phase rich with the amine-type epoxy resin [A] and the phase rich with the block copolymer [C] having a reactive group capable of reacting with an epoxy resin was observed. The phase separation structure of a hardened material varies between the phase continuous structure and the sea-island structure according to the types of [A] and [C] and their blending ratio, and measurements were made differently according to the case as described as follows:

In the case of the phase continuous structure, a straight line of a predetermined length was drawn on a microscopic photograph, and intersections between this straight line and the phase interface were located. Distances between adjacent intersections were then measured, with their number average calculated as the structural interval. On the basis of a microscopic photograph, such a predetermined length was set as follows: When the structural interval was expected to be in the order of 10 nm (10 nm or more and less than 100 nm), the predetermined length was the combined whole of three 20 mm-long straight lines randomly drawn on a photograph taken at a magnification of ×20,000 (1 μm-long straight lines on the specimen). Similarly, when the structural interval was expected to be in the order of 100 nm (100 nm or more and less than 1 μm), the predetermined length was the combined whole of three 20 mm-long straight lines randomly drawn on a photograph taken at a magnification of ×2000 (10 μm-long straight lines on the specimen), while the structural interval was expected to be in the order of 1 μm (1 μm or more and less than 10 μm), the predetermined length was the combined whole of three 20 mm-long straight lines randomly drawn on a photograph taken at a magnification of ×200 (100 μm-long straight lines on the specimen). When the measured the structural interval fell outside the expected range, a repeat measurement was made of the same line at the magnification that corresponded to the actual the structural interval.

In the case of the sea-island structure, the lengths of the major axes of all island phases present in a predetermined region was measured. On the basis of a microscopic photograph, such a predetermined region was set as follows: When phase separation size was expected to be less than 100 nm, the predetermined region was the combined whole of three 20 mm-square regions randomly selected on a photograph taken at a magnification of ×20,000 (1 μm-square regions on the specimen). Similarly, when phase separation size was expected to be in the order of 100 nm (100 nm or more and less than 1 μm), the predetermined region was the combined whole of three 20 mm-square regions randomly selected on a photograph taken at a magnification of ×2000 (10 μm-square regions on the specimen), while, when phase separation size was expected to be in the order of 1 μm (1 μm or more and less than 10 μm), it is the combined whole of three 20 mm-square regions randomly selected on a photograph taken at a magnification of ×200 (100 μm-square regions on the specimen). When the measured phase separation size fell outside the expected range, a repeat measurement was made of the same region at the magnification that corresponded to the actual phase separation size.

(6) Stability of Morphological Variation

After defoaming under vacuum, the epoxy resin composition prepared in (1) was heated at two rates of 1.5° C./min and 5° C./min over the temperature range of 30° C. to 180° C. and then cured at 180° C. for 2 hours, and this produced two hardened resin materials with different sets of molding conditions. Transmission electron images were taken using the method described in (5), and phase separation structure sizes were measured, with the width of variation in phase separation structure size calculated using the formula shown below.

Width of variation (%)={Phase separation structure size when heated at 5° C./min during molding process/(Phase separation structure size when heated at 1.5° C./min during molding process−1)}×100

Working Example 1

After kneading 20 parts by weight of N,N-diglycidyl-4-phenoxy aniline (difunctional amine-type epoxy resin [A]), 70 parts by weight of ELM434 (polyfunctional amine-type epoxy resin [A]), 10 parts by weight of EPON825 (epoxy resin other than [A]) and 7 parts by weight of SM4032XM10 (block copolymer [C] having reactive group capable of reacting with epoxy resin) in a piece of kneading equipment, 45 parts by weight of Seikacure-S, which is an aromatic amine curing agent [B] was kneaded to prepare an epoxy resin composition. Table 1 shows the composition and blending ratio (All figures shown in Table 1 are in parts by weight.). The epoxy resin composition obtained was subjected to the measurement of the bending modulus of elasticity, KIC, glass transition temperature, phase separation structure size and variation in phase separation structure size according to molding conditions, all with regard to a hardened resin material, in accordance with the procedures described in (2) Measurement of bending modulus of elasticity of hardened resin material, (3) Measurement of toughness (KIC) of hardened resin material, (4) Measurement of glass transition temperature of hardened resin material, (5) Measurement of phase separation structure size, and (6) Stability of morphological variation above. The results are shown in Table 1.

Comparative Example 1

When 100 parts by weight of N,N-diglycidyl-4-phenoxy aniline (difunctional epoxy resin [A]) and 7 parts by weight of M22N (block copolymer not containing reactive group, capable of reacting with epoxy resin) were kneaded in a piece of kneading equipment, they did not dissolve. Table 2 shows the composition and blending ratio (All figures shown in Table 2 are in parts by weight)

Working Examples 2 to 12 and Comparative Examples 2 to 7

Epoxy resin compositions were prepared in the same manner as Working Example 1, except for changes made to the types and blending amounts of the epoxy resin and curing agent as shown in Tables 1 and 2. The obtained epoxy resin compositions were subjected to the measurement of the bending modulus of elasticity, KIC, glass transition temperature, phase separation structure size and variation in phase separation structure size according to molding conditions, all with regard to a hardened resin material, in accordance with the procedures described in (2) Measurement of bending modulus of elasticity of hardened resin material and (3) Measurement of toughness (KIC) of hardened resin material, (4) Measurement of glass transition temperature of hardened resin material, (5) Measurement of phase separation structure size, and (6) Stability of morphological variation above. The results are shown in Tables 1 and 2.

TABLE 1

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Amine type epoxy resin [A] (difunctional epoxy resin) | | | | | | | | | | | | |
| N,N-diglycidyl-4-phenoxy aniline (polyfunctional epoxy resin) | 20 | 35 | 50 | | 5 | | 50 | 10 | 40 | 40 | 50 | 50 |
| ELM434 | 70 | 50 | 30 | | 85 | | | 70 | | | 30 | 30 |
| jER630 (epoxy resin other than [A]) | | | | 100 | | 70 | 20 | | 40 | 30 | | |
| EPON825 | 10 | 15 | 20 | | 10 | 30 | | 20 | 20 | 30 | 20 | 20 |
| jER4007P | | | | | | | | | | | | |
| jER152 | | | | | | | 30 | | | | | |
| block copolymer ([C] etc.) (block copolymer [C] having reactive group reactive with epoxy resin) | | | | | | | | | | | | |
| block copolymer SM4032XM10 | 7 | 7 | 7 | 7 | 7 | 7 | 7 | 3 | 13 | 7 | | |
| block copolymer (MMA-GMA) - EHMA | | | | | | | | | | | 7 | |
| block copolymer (MA-AA) - BA (block copolymer containing no reactive group reactive with epoxy resin) | | | | | | | | | | | | 7 |
| block copolymer M22N | | | | | | | | | | | | |
| Other component | | | | | | | | | | | | |
| Toraypearl TN | | | | | | | | | | 15 | | |
| aromatic amine curing agent ([B]) | | | | | | | | | | | | |
| Seikacure-S | 45 | 45 | 40 | 35 | 50 | 55 | 40 | 45 | 45 | 45 | 40 | 40 |
| 3,3'-DAS | | | | | | | | | | | | |
| Characteristics of composition | | | | | | | | | | | | |
| 80° C. viscosity (Pa · s) | 46 | 32 | 23 | 4 | 79 | 11 | 17 | 21 | 27 | 182 | 4 | 18 |
| Characteristics of cured resin | | | | | | | | | | | | |
| bending elastic modulus (MPa) | 4.1 | 3.9 | 3.8 | 4.3 | 4.2 | 3.9 | 3.8 | 3.9 | 3.8 | 3.7 | 3.7 | 3.8 |
| $K_{IC}$ (MPa · m$^{0.5}$) | 0.9 | 1.0 | 1.1 | 0.7 | 0.8 | 0.9 | 1.0 | 0.9 | 1.0 | 1.1 | 0.9 | 1.0 |
| glass transition temperature (° C.) | 191 | 184 | 162 | 267 | 225 | 208 | 159 | 198 | 167 | 162 | 164 | 160 |
| heat-molded at 1.5° C./min phase-separation structure size (μm) | 0.05 | 0.06 | 0.04 | 0.11 | 0.08 | 0.03 | 0.03 | 0.06 | 0.05 | 0.28 | 0.22 | 0.05 |
| heat-molded at 5° C./min phase-separation structure size (μm) | 0.05 | 0.06 | 0.04 | 0.12 | 0.09 | 0.03 | 0.03 | 0.06 | 0.05 | 0.32 | 0.25 | 0.05 |
| variation range of phase-separation structure size (%) | 6 | 3 | 1 | 9 | 13 | 4 | 3 | 3 | 8 | 14 | 14 | 1 |

Note)
Figures of phase separation structure size are rounded to two decimal places, but non-rounded figures of phase separation structure size were used to calculate variation range.

TABLE 2

|  | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|
| Amine type epoxy resin [A] (difunctional epoxy resin) | | | | | | | | |
| N,N-diglycidyl-4-phenoxy aniline (polyfunctional epoxy resin) | | 35 | 40 | 60 | 10 | | 30 | 30 |
| ELM434 | | 50 | | | | | 50 | 50 |
| jER630 (epoxy resin other than [A]) | 100 | | 40 | | 20 | | | |
| EPON825 | | 15 | 20 | 40 | 70 | | 20 | 20 |
| jER4007P | | | | | | 70 | | |

TABLE 2-continued

| | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|
| jER152 | | | | | | 30 | | |
| Block copolymer ([C] etc.) | | | | | | | | |
| (block copolymer [C] having reactive group reactive with epoxy resin) | | | | | | | | |
| block copolymer SM4032XM10 | | | | 7 | 7 | 7 | 1 | 18 |
| (block copolymer containing no reactive group reactive with epoxy resin) | | | | | | | | |
| block copolymer M22N | 7 | 7 | | | | | | |
| Other component | | | | | | | | |
| Toraypearl TN | | | | | | | | |
| Aromatic amine curing agent ([B]) | | | | | | | | |
| Seikacure-S | 35 | 45 | 45 | 40 | 35 | | 45 | 45 |
| 3,3'-DAS | | | | | | 20 | | |
| Characteristics of composition | | | | | | | | |
| 80° C. viscosity (Pa · s) | 15 | 62 | 3 | 12 | 14 | 212 | 32 | 129 |
| Characteristics of cured resin | | | | | | | | |
| bending elastic modulus (MPa) | — | 3.3 | 3.8 | 3.5 | 3.3 | 3.2 | 3.9 | 3.5 |
| $K_{IC}$ (MPa · m$^{0.5}$) | — | 0.6 | 0.5 | 1.0 | 1.4 | 1.5 | 0.6 | 0.8 |
| glass transition temperature (° C.) | — | 174 | 178 | 152 | 143 | 135 | 188 | 185 |
| heat-molded at 1.5° C./min phase-separation structure size (μm) (μm) | — | 7 | — | 0.11 | 0.09 | 0.03 | 0.03 | 0.06 |
| heat-molded at 5° C./min phase-separation structure size (μm) | — | 19 | — | 0.12 | 0.09 | 0.03 | 0.03 | 0.22 |
| variation range of phase-separation structure size (%) | — | 171 | — | 9 | 2 | 3 | 3 | 267 |

Note)
Figures of phase separation structure size are rounded to two decimal places (to whole number in Comparative example 2), but non-rounded figures phase separation structure size were used to calculate variation range.

A cross-comparison of Working Examples 1 to 12 and Comparative Examples 1 to 8 has shown that the epoxy resin composition of the present invention has low viscosity and that the hardened epoxy resin material of the present invention forms a fine phase separation structure with only a small morphological variation according to molding conditions, as well as exhibiting high heat resistance, in addition to a high modulus of elasticity and high toughness.

A cross-comparison of Working Examples 1 to 12 and Comparative Examples 4 to 6 has shown that, even if component [C] is contained, satisfactory hardened material characteristics cannot be obtained unless component [A] is contained by a prescribed amount.

A cross-comparison of Working Examples 1 to 12 and Comparative Examples 7 and 8 has shown that, even if component [C] is contained, satisfactory hardened material characteristics cannot be obtained unless it is contained by a prescribed amount.

A cross-comparison of Working Examples 2 and 4 and Comparative Examples 1 to 3 has shown that, even if component [A] is contained by a prescribed amount, satisfactory hardened material characteristics cannot be obtained unless component [C] is contained, with the associated problems ranging from the occurrence of morphological variation according to molding conditions and incompatibility between the epoxy resin and block copolymer.

The second preferred embodiment of the present invention relating to an epoxy resin composition and a prepreg and fiber-reinforced composite material based on it is now described in more detail by way of a working example. The preparation methods for the resin ingredients, prepreg and fiber-reinforced composite material and evaluation methods used in the working example are shown below. Unless otherwise noted, prepreg preparation and evaluations for the working example were carried under environmental conditions consisting of an ambient temperature of 25° C.±2° C. and a relative humidity of 50%.

<Carbon Fiber (Reinforcement Fiber)>
"Torayca (registered trademark)" T800G-24K-31E (carbon fiber with 24,000 filaments, tensile strength 5.9 GPa, tensile modulus 294 GPa and tensile elongation 2.0%, manufactured by Toray Industries, Inc.).

<Epoxy Resin>
Epoxy Resin [A']
N,N-diglycidyl-4-phenoxy aniline synthesized using the method described below ([A'2])
After placing 610.6 g (6.6 mol) of epichlorohydrin in a four-necked flask fitted with a thermometer, dropping funnel, cooling pipe and stirrer, the temperature was raised to 70° C. while performing a nitrogen purge, and 203.7 g (1.1 mol) of p-phenoxy aniline, dissolved into 1020 g of ethanol, was dropped over four hours. It was stirred for a further six hours to complete the addition reaction, and 4-phenoxy-N,N-bis(2-hydroxy-3-chloropropyl)aniline resulted. After lowering the temperature inside the flask to 25° C., 229 g (2.75 mol) of a 48% aqueous solution of NaOH was dropped over two hours, followed by another hour of stirring. After the completion of cyclization reaction, ethanol was removed through evaporation, and extraction was performed using 408 g of toluene, followed by two lots of washing using a 5% saline solution. After removing toluene and epichlorohydrin from the organic layer under reduced pressure, 308.5 g (yield 94.5%) of a brown-colored viscous liquid was obtained. The purity of the main product, N,N-diglycidyl-4-phenoxy aniline, was 91% (GCArea %).

"Denacol (registered trademark)" Ex-731 (N-glycidyl-phthalimide, manufactured by Nagase ChemteX Corporation) ([A'1])

OPP-G (o-phenyl phenyl glycidyl ether, manufactured by Sanko Co., Ltd.) ([A'1])

N-glycidyl carbazole synthesized using the method described below ([A'1])

N-glycidyl carbazole was obtained through glycidylation reaction using the same reaction conditions and procedure as the N-glycidyl carbazole synthesis of N,N-diglycidyl-4-phenoxy aniline described above, except for a change of the precursor compound to the exepoxy resin to carbazole.

Epoxy Resin [B']
  ELM434 (tetraglycidyl diaminodiphenyl methane, manufactured by Sumitomo Chemical Co., Ltd.)
  "jER" (registered trademark) 630 (triglycidyl-p-aminophenol, manufactured by Mitsubishi Chemical Corporation).

Difunctional Epoxy Resin Other than [A'] or [B']
  "EPON" (registered trademark) 825 (bisphenol A-type epoxy resin, manufactured by Mitsubishi Chemical Corporation))
  GOT (N-diglycidyl toluidine, manufactured by Nippon Kayaku Co., Ltd.)
  GAN(N-diglycidyl aniline, manufactured by Nippon Kayaku Co., Ltd.)
  Ex-146 (p-tert-butyl phenyl glycidyl ether, manufactured by Nagase ChemteX Corporation).

<Curing Agent [C']>
  "Seikacure" (registered trademark)-S (4,4'-diaminodiphenyl sulfone, manufactured by Wakayama Seika Kogyo Co., Ltd.)
  3,3'-DAS (3,3'-diaminodiphenyl sulfone, manufactured by Mitsui Fine Chemical, Inc.).

<Elastomer Component [D']>
  "(Nanostrength)" (registered trademark) M22N (M-B-M block copolymer where B is butyl acrylate (Tg: −54° C.) and M comprises random copolymer chains of methyl methacrylate and polar acrylic monomer, manufactured by Arkema K.K.)
  "(Nanostrength)" (registered trademark) SM4032XM10 (M-B-M block copolymer [C] where B is butyl acrylate (Tg: −54° C.) and M comprises random copolymer chains of methyl methacrylate and acrylic monomer containing carboxyl group, manufactured by Arkema K.K.)
  "Kane Ace (registered trademark)" MX-416 (styrene-butadiene-methyl methacrylate core-shell rubber particles, average particle diameter: 100 nm, Kaneka Corporation). 40 mass % master batch based on tetraglycidyl diaminodiphenyl methane. In Tables 1 to 5, composition tables for working examples and comparative examples, show blending amounts of the chemical in terms of rubber particles, with tetraglycidyl diaminodiphenyl methane included in the master batch shown as part of ELM434.

<Thermoplastic Resin Particles [E']>
  "Toraypearl (registered trademark)" TN (manufactured by Toray Industries, Inc., average particle diameter: 13.0 µm).

<Thermoplastic Resin [F']>
  "Sumikaexcel (registered trademark)" PES5003P (polyethersulfone, manufactured by Sumitomo Chemical Co., Ltd.).

(7) Preparation of Prepreg (1) A resin film was prepared by coating pieces of release paper with the epoxy resin composition prepared in (1) using a knife coater. Next, pieces of carbon fiber "Torayca" (registered trademark) T800G-24K-31E, manufactured by Toray Industries, Inc., were laid side by side in the same orientation to form a sheet shape, and a piece of resin film was placed over this sheet from both sides. The carbon fiber was then impregnated with the resin through the application of heat and pressure, and a unidirectional prepreg comprising a carbon fiber with a cross-sectional density of 190 g/m$^2$ and a matrix resin with a weight share of 35.5% was obtained.

(8) Measurement of 0° Tensile Strength of Fiber-reinforced Composite Material

The unidirectional prepreg prepared in (7) was cut to obtain sheets of a prescribed size. After laminating six of those sheets in the same orientation, vacuum bagging was performed, followed by curing for two hours at a temperature of 180° C. and a pressure of 6 kg/cm2 using an autoclave, and a unidirectionally reinforced material (fiber-reinforced composite material) was obtained. This unidirectionally reinforced material was trimmed to the size of 12.7 mm wide and 230 mm long, and a 1.2 mm glass fiber-reinforced plastic tab measuring 50 mm long was bonded to both ends to obtain a specimen. The specimen was then subjected to a 0° tensile test in accordance with JISK7073-1988 using an Instron universal testing machine (measuring temperature −60° C.).

As described in JIS K7017 (1999), the fiber direction of a unidirectional fiber-reinforced composite material is defined as the 0° axis direction, with the direction orthogonal to it defined as the 90° axis direction.

(9) Measurement of Glass Transition Temperature of Fiber-reinforced Composite Material Using a differential scanning calorimeter (DSC), the specimen obtained in (8) was subjected to the measurement of the glass-transition temperature of a fiber-reinforced composite material in accordance with JIS K7121 (1987). The specimen (test piece) weighing 8 to 20 mg was placed in a 50 µl sealed specimen container and heated from 30 to 350° C. at a rate of 10° C./min, and the glass transition temperature was measured. Here, a differential scanning calorimeter (DSC) manufactured by TA Instruments was used as measuring equipment. In concrete terms, referring to the portion of the obtained DSC curve that shows a stepwise change, the glass transition temperature is defined as the temperature at the point where a straight line that is vertically at equal distances from the extrapolated portions of the baselines intersects with the stepwise-changing portion of the DSC curve.

(10) Measurement of Prepreg Volatile Content

The unidirectional prepreg prepared in (7) was cut to obtain a specimen measuring 50×50 mm. After weighing (W1), the specimen was left in a hot air drier set at a temperature of 160° C. for 20 minutes whilst being placed on an aluminum plate, followed by natural cooling to 25° C. inside a desiccator, and the specimen was weighed again (W2). The prepreg volatile content in mass % was then calculated using the following formula:

$$PVC=(W1-W2)/W1\times 100$$

PVC: Prepreg volatile content (mass %)
Volatile content (mass %)=PVC×100/RC
RC: Resin content of prepreg (mass %).

(11) Proportion of Particles Present within Surface 20% Depth Range of Thickness of Prepreg Held between two smooth-surfaced polytetrafluoroethylene resin plates in close contact, the unidirectional prepreg prepared in (7) was turned into a gel and cured over seven days by gradually raising the temperature to 150° C. to produce a plate-like hardened resin material out of the prepreg. After curing, the hardened resin material was dissected in the direction perpendicular to the contact surfaces. After polishing, this cross section was first magnified 200 times or more using an optical microscope and photographed while ensuring that the top and bottom surfaces of the prepreg are captured within the field of view. The distance between the polytetrafluoroethylene resin plates was then measured at five points set up across the width of the cross-sectional photograph, with the average reading (n=5) defined as the thickness of the prepreg. Now, with both sides of the prepreg, a line parallel to the surface was drawn at 20% of depth in the thickness direction. Next, the total area of particles present between the surface and said line and the total area of particles present across the entire thickness of the hardened material were found, followed by the calculation of the proportion of particles present within 20% of depth into the 100% thickness of the material. Here, the total area of particles was determined by gouging out parts of the cross-sectional photograph containing particles and converting their combined mass.

(12) Measurement of Post-impact Compressive Strength of Fiber-Reinforced Composite Material Twenty-four plies of the unidirectional prepreg prepared in (7) were quasi-isotropically laminated in the [+45°/0°/−45°/90°]3 s configuration and molded in an autoclave over two hours at a temperature of 180° C., pressure of 6 kg/cm2 and rate of temperature increase of 1.5° C./min to produce a quasi-isotropic laminate (fiber-reinforced composite material). A 4.5 mm-thick specimen measuring 150 mm long× 100 mm wide was then cut out of this quasi-isotropic laminate, and the post-impact compressive strength was measured after applying a weight-drop impact of 6.7 J/mm to the center of the specimen in accordance with SACMA SRM 2R-94.

(13) Preparation of Flat Composite Plate for Mode-I Interlaminar Toughness (GIC) Test and Measurement of GIC Following steps (a) to (f) below, a flat composite plate for a GIC test was prepared in accordance with JIS K7086.

(a) Twenty plies of the unidirectional prepreg prepared in (7) were laminated with a uniform fiber orientation, except that a piece of 40 mm-wide film was inserted into the middle of the laminate (between the 10th and 11th plies) perpendicularly to the fiber orientation.

(b) After being tightly covered with nylon film without any gaps, the laminated prepregs were thermo-compressively cured inside an autoclave over two hours at a temperature of 135° C. and an internal pressure of 588 kPa to mold a unidirectional fiber-reinforced composite material.

(c) A specimen measuring 20 mm wide and 195 mm long was cut out of the unidirectional fiber-reinforced composite material obtained in step (b), with the fiber direction set parallel to the length of the specimen.

(d) A pin load block (25 mm long, aluminum) was bonded to the edge of the specimen (the side where a piece of film was inserted) in accordance with JIS K7086.

(e) A 2 to 5 mm precrack was introduced to the specimen by cutting it open at the location where the film was inserted with a knife or other blade instrument.

(f) To make the observation of crack growth easier, white paint was applied to both side faces of the specimen.

Using the prepared flat composite plate, GIC measurement was conducted according to the following procedure:

The test was conducted using an Instron universal testing machine (manufactured by Instron Corporation) in accordance with JIS K7086 (2006). The crosshead speed was set at 0.5 mm/min until the crack grew to 20 mm and 1 mm/min after that GIC was calculated from the load, displacement, and crack length.

Working Example 13

After kneading 20 parts by weight of N,N-diglycidyl-4-phenoxy aniline (epoxy resin [A']), 80 parts by weight of ELM434 (epoxy resin [B']) and 8 parts by weight of "Kane Ace (registered trademark)" MX-416 in a piece of kneading equipment, 50 parts by weight of Seikacure-S (curing agent [C']) was kneaded to prepare an epoxy resin composition for fiber-reinforced composite materials. Table 3 shows the composition and blending ratio (All figures shown in Table 3 are in parts by weight.). The epoxy resin composition obtained was subjected to the measurement of the bending modulus of elasticity and KIC, both with regard to a hardened resin material, in accordance with the procedures described in (2) Measurement of bending modulus of elasticity of hardened resin material and (3) Measurement of toughness (KIC) of hardened resin material. A resin film was also prepared by coating pieces of release paper with the prepared epoxy resin composition at an areal density of 50 g/m$^2$ using a knife coater. The resin film was then placed on a carbon fiber sheet prepared by laying pieces of carbon fiber side by side in the same orientation to form a sheet shape (areal density 200 g/m$^2$) from both sides, and the carbon fiber sheet was thermo-compressively impregnated with the epoxy resin composition at a temperature of 100° C. and a pressure of 1 atm. using a heat roller. The obtained prepreg was subjected to the measurement of volatile content in accordance with (10) above. The obtained prepreg was also subjected to the preparation of a fiber-reinforced composite material and the measurement of 0° tensile strength, glass transition temperature, post-impact compressive strength and GIC as described in (8) Measurement of 0° tensile strength of fiber-reinforced composite material, (9) Measurement of glass transition temperature of fiber-reinforced composite material, (12) Measurement of post-impact compressive strength of fiber-reinforced composite material, and (13) Preparation of flat composite plate for mode-I interlaminar toughness (GIC) test and measurement of GIC above.

Comparative Example 9

After kneading 100 parts by weight of N,N-diglycidyl-4-phenoxy aniline (epoxy resin [A']) and 6 parts by weight of "Nanostrength" (registered trademark) SM4032XM10 in a piece of kneading equipment, 50 parts by weight of Seikacure-S (curing agent [C']) was kneaded to prepare an epoxy resin composition for fiber-reinforced composite materials. Table 6 shows the composition and blending ratio (All figures shown in Table 6 are in parts by weight.). Although the obtained epoxy resin composition was subjected to the preparation of a hardened resin material and measurement of its characteristics as described in (2) Measurement of bending modulus of elasticity of hardened resin material and (3) Measurement of toughness (KIC) of hardened resin material, measurement was difficult due to the development of surface cracks on the hardened resin material. A resin film was, also prepared by coating pieces of release paper with the prepared epoxy resin composition at an areal density of 50 g/m$^2$ using a knife coater. The resin film was then placed on a carbon fiber sheet prepared by laying pieces of carbon fiber side by side in the same orientation to form a sheet shape (areal density 200 g/m$^2$) from both sides, and the carbon fiber sheet was thermo-compressively impregnated with the epoxy resin composition at a temperature of 100° C. and a pressure of 1 atmosphere using a heat roller. Although the obtained prepreg was subjected to the preparation of a fiber-reinforced composite material and the measurement of 0° tensile strength as described in (8) Measurement of 0° tensile strength of fiber-reinforced composite material above, measurement was difficult due to the development of surface cracks on the hardened resin material.

Working Examples 14 to 33 and Comparative Examples 10 to 22

Epoxy resin compositions and prepregs were prepared in the same manner as Working Example 1, except for changes made to the types and blending amounts of the epoxy resin and curing agent as shown in Tables 3 to 5, 6 and 7. The obtained epoxy resin compositions were subjected to the measurement of the bending modulus of elasticity and KIC, both with regard to a hardened resin material, in accordance with the procedures described in (2) Measurement of bending modulus of elasticity of hardened resin material and (3) Measurement of toughness (KIC) of hardened resin material above. The obtained prepreg was subjected to the measurement of volatile content in accordance with (10) above. The obtained prepreg was also subjected to the preparation of a fiber-reinforced composite material and the measurement of 0° tensile strength, glass transition temperature, post-impact compressive strength and GIC as described in (8) Measurement of 0° tensile strength of fiber-reinforced composite material, (9) Measurement of glass transition temperature of fiber-reinforced composite material, (12) Measurement of post-impact compressive strength of fiber-reinforced composite material, and (13) Preparation of flat composite plate for mode-I interlaminar toughness (GIC) test and measurement of GIC above. Results are shown in Table 3 to 5, 6 and

TABLE 3

|  | Example 13 | Example 14 | Example 15 | Example 16 | Example 17 | Example 18 | Example 19 |
|---|---|---|---|---|---|---|---|
| epoxy resin (epoxy resin [A']) | | | | | | | |
| N,N-diglycidyl-4-phenoxy aniline | 20 | 25 | 30 | 40 | 50 | 60 | 40 |
| Ex-731 | | | | | | | |
| OPP-G | | | | | | | |
| N-glycidyl carbazole | | | | | | | |
| (epoxy resin [B']) | | | | | | | |
| ELM434 | 80 | 75 | 70 | 60 | 50 | 40 | 50 |
| jER630 | | | | | | | |
| (epoxy resin other than [A'] and [B']) | | | | | | | |
| EPON825 | | | | | | | 10 |
| GOT | | | | | | | |
| GAN | | | | | | | |
| Ex-146 | | | | | | | |
| elastomer component [D'] | | | | | | | |
| block copolymer M22N | | | | | | | |
| block copolymer SM4032XM10 | | | | | | | 6 |
| core shell rubber particles MX416 | 8 | 8 | 7 | 6 | 5 | 4 | |
| thermoplastic resin particles [E'] | | | | | | | |
| Toraypearl TN | | | | | | | |
| thermoplastic resin [F'] | | | | | | | |
| Sumikaexcel PES5003P | | | | | | | |
| curing agent [C'] | | | | | | | |
| Seikacure-S | 50 | 50 | 50 | 45 | 45 | 45 | 50 |
| 3,3'-DAS | | | | | | | |
| characteristics of cured resin | | | | | | | |
| bending elastic modulus (MPa) | 3.4 | 3.5 | 3.6 | 3.8 | 3.9 | 4.0 | 3.9 |
| $K_{IC}$ (MPa·m$^{0.5}$) | 0.7 | 0.8 | 0.7 | 0.9 | 0.9 | 0.8 | 1.0 |
| characteristics of prepreg and fiber reinforced composite material | | | | | | | |
| glass transition temperature (° C.) | 205 | 199 | 192 | 178 | 168 | 156 | 178 |
| volatile matter (wt %) | 0.5 | 0.4 | 0.6 | 0.7 | 0.7 | 0.9 | 0.6 |
| tensile strength (MPa) | 2640 | 2750 | 2850 | 2990 | 3040 | 2910 | 3130 |
| compression strength after impact (MPa) | 181 | 185 | 198 | 201 | 187 | 182 | 204 |
| proportion of particles in 20% depth range (%) | — | — | — | — | — | — | — |
| $G_{IC}$ (J/m$^2$) | 540 | 550 | 570 | 590 | 610 | 570 | 600 |
| content per total epoxy resin in resin composition (mass %) | | | | | | | |
| A' (mass %) | 20 | 25 | 30 | 40 | 50 | 60 | 40 |
| B' (mass %) | 80 | 75 | 70 | 60 | 50 | 40 | 50 |

TABLE 4

|  | Example 20 | Example 21 | Example 22 | Example 23 | Example 24 | Example 25 | Example 26 |
|---|---|---|---|---|---|---|---|
| epoxy resin (epoxy resin [A']) | | | | | | | |
| N,N-diglycidyl-4-phenoxy aniline | 30 | 20 | 40 | 40 | 40 | | |
| Ex-731 | | | | | | 5 | 10 |
| OPP-G | | | | | | | |
| N-glycidyl carbazole | | | | | | | |
| (epoxy resin [B']) | | | | | | | |
| ELM434 | 50 | 50 | 60 | 60 | 60 | 60 | 60 |
| jER630 | | | | | | | |
| (epoxy resin other than [A'] and [B']) | | | | | | | |
| EPON825 | 20 | 30 | | | | 35 | 30 |
| GOT | | | | | | | |
| GAN | | | | | | | |
| Ex-146 | | | | | | | |
| elastomer component [D'] | | | | | | | |
| block copolymer M22N | 6 | 6 | | | | | |
| block copolymer SM4032XM10 | | | 6 | 6 | 6 | 6 | 6 |
| core shell rubber particles MX416 | | | | | | | |
| thermoplastic resin particles [E'] | | | | | | | |
| Toraypearl TN | | | | 20 | 20 | 20 | 20 |
| thermoplastic resin [F'] | | | | | | | |
| Sumikaexcel PES5003P | | | | 12 | 10 | | |
| curing agent [C'] | | | | | | | |
| Seikacure-S | 50 | 50 | | 45 | | 40 | 40 |
| 3,3'-DAS | | | 45 | | 45 | | |
| characteristics of cured resin | | | | | | | |
| bending-elastic modulus (MPa) | 3.7 | 3.5 | 4.3 | 3.7 | 4.1 | 3.4 | 3.5 |
| $K_{IC}$ (MPa · m$^{0.5}$) | 0.9 | 0.9 | 0.9 | 1.1 | 1.2 | 0.8 | 0.9 |
| characteristics of prepreg and fiber reinforced composite material | | | | | | | |
| glass transition temperature (° C.) | 186 | 191 | 189 | 192 | 189 | 194 | 188 |
| volatile matter (wt %) | 0.6 | 0.6 | 0.7 | 1.1 | 0.8 | 0.8 | 1.2 |
| tensile strength (MPa) | 3040 | 3010 | 2990 | 3210 | 3120 | 2850 | 2910 |
| compression strength after impact (MPa) | 215 | 200 | 230 | 371 | 380 | 363 | 361 |
| proportion of particles in 20% depth range (%) | — | — | — | 98 | 97 | 98 | 98 |
| $G_{IC}$ (J/m$^2$) | 580 | 570 | 560 | 670 | 650 | 580 | 590 |
| content per total epoxy resin in resin composition (mass %) | | | | | | | |
| A' (mass %) | 30 | 20 | 40 | 40 | 40 | 5 | 10 |
| B' (mass %) | 50 | 50 | 60 | 60 | 60 | 60 | 60 |

TABLE 5

|  | Example 27 | Example 28 | Example 29 | Example 30 | Example 31 | Example 32 | Example 33 |
|---|---|---|---|---|---|---|---|
| epoxy resin (epoxy resin [A']) | | | | | | | |
| N,N-diglycidyl-4-phenoxy aniline | | | | | | | |
| Ex-731 | 20 | 30 | 30 | | | 30 | 30 |
| OPP-G | | | | 30 | | | |
| N-glycidyl carbazole | | | | | 30 | | |
| (epoxy resin [B']) | | | | | | | |
| ELM434 | 60 | 60 | 70 | 70 | 70 | 70 | 70 |
| jER630 | | | | | | | |
| (epoxy resin other than [A'] and [B']) | | | | | | | |
| EPON825 | 20 | 10 | | | | | |
| GOT | | | | | | | |
| GAN | | | | | | | |
| Ex-146 | | | | | | | |

TABLE 5-continued

|  | Example 27 | Example 28 | Example 29 | Example 30 | Example 31 | Example 32 | Example 33 |
|---|---|---|---|---|---|---|---|
| elastomer component [D'] | | | | | | | |
| block copolymer M22N | | | | | | | |
| block copolymer SM4032XM10 | 6 | 6 | 6 | 6 | 6 | | |
| core shell rubber particles MX416 | | | | | | 6 | 6 |
| thermoplastic resin particles [E'] | | | | | | | |
| Toraypearl TN | 20 | 20 | 20 | 20 | 20 | 20 | 20 |
| thermoplastic resin [F'] | | | | | | | |
| Sumikaexcel PES5003P | | | | | | 10 | 10 |
| curing agent [C'] | | | | | | | |
| Seikacure-S | 40 | 44 | 33 | 40 | 40 | 40 | |
| 3,3'-DAS | | | | | | | 40 |
| characteristics of cured resin | | | | | | | |
| bending elastic modulus (MPa) | 3.6 | 3.7 | 3.7 | 3.6 | 3.5 | 3.4 | 3.8 |
| $K_{IC}$ (MPa·m$^{0.5}$) | 1.0 | 1.0 | 1.0 | 1.1 | 1.0 | 1.1 | 1.1 |
| characteristics of prepreg and fiber reinforced composite material | | | | | | | |
| glass transition temperature (°C.) | 179 | 180 | 180 | 169 | 190 | 183 | 177 |
| volatile matter (wt %) | 1.9 | 2.9 | 2.7 | 3.8 | 1.2 | 2.3 | 2.0 |
| tensile strength (MPa) | 3020 | 3030 | 3030 | 3170 | 3100 | 3070 | 2920 |
| compression strength after impact (MPa) | 367 | 375 | 354 | 367 | 356 | 341 | 346 |
| proportion of particles in 20% depth range (%) | 96 | 97 | 97 | 98 | 98 | 96 | 97 |
| $G_{IC}$ (J/m$^2$) | 620 | 630 | 620 | 640 | 610 | 510 | 590 |
| content per total epoxy resin in resin composition (mass %) | | | | | | | |
| A' (mass %) | 20 | 30 | 30 | 30 | 30 | 30 | 30 |
| B' (mass %) | 60 | 60 | 70 | 70 | 70 | 70 | 70 |

TABLE 6

|  | Comparative example 9 | Comparative example 10 | Comparative example 11 | Comparative example 12 | Comparative example 13 | Comparative example 14 | Comparative example 15 |
|---|---|---|---|---|---|---|---|
| epoxy resin (epoxy resin [A']) | | | | | | | |
| N,N-diglycidyl-4-phenoxy aniline | 100 | | | 30 | | | |
| Ex-731 | | | | | | | |
| OPP-G | | | | | | | |
| N-glycidyl carbazole (epoxy resin [B']) | | | | | | | |
| ELM434 | | 100 | 70 | | | | |
| jER630 | | | | | 60 | 60 | 60 |
| (epoxy resin other than [A'] and [B']) | | | | | | | |
| EPON825 | | | 30 | 70 | | | |
| GOT | | | | | 40 | | |
| GAN | | | | | | 40 | |
| Ex-146 | | | | | | | 40 |
| elastomer component [D'] | | | | | | | |
| block copolymer M22N | | | | | 6 | 6 | 6 |
| block copolymer SM4032XM10 | 6 | 6 | 6 | 6 | | | |
| core shell rubber particles MX416 | | | | | | | |
| thermoplastic resin particles [E'] | | | | | | | |
| Toraypearl TN | | | | | | | |
| thermoplastic resin [F'] | | | | | | | |
| Sumikaexcel PES5003P | | | | | | | |
| curing agent [C'] | | | | | | | |
| Seikacure-S | 50 | 50 | 45 | 35 | 55 | 55 | 60 |
| 3,3'-DAS | | | | | | | |

TABLE 6-continued

| | Comparative example 9 | Comparative example 10 | Comparative example 11 | Comparative example 12 | Comparative example 13 | Comparative example 14 | Comparative example 15 |
|---|---|---|---|---|---|---|---|
| characteristics of cured resin | | | | | | | |
| bending elastic modulus (MPa) | — | 3.4 | 3.3 | 3.6 | 4.8 | 3.7 | 3.6 |
| $K_{IC}$ (MPa · m$^{0.5}$) | — | 0.6 | 0.7 | 0.8 | 0.7 | 0.8 | 0.7 |
| characteristics of prepreg and fiber reinforced composite material | | | | | | | |
| glass transition temperature (° C.) | — | 267 | 207 | 145 | 169 | 176 | 160 |
| volatile matter (wt %) | — | 0.4 | 0.5 | 0.7 | 5.2 | 6.0 | 6.9 |
| tensile strength (MPa) | — | 2130 | 2380 | 2890 | 2920 | 2840 | 2890 |
| compression strength after impact (MPa) | — | 204 | 184 | 167 | 195 | 188 | 179 |
| proportion of particles in 20% depth range (%) | — | — | — | — | — | — | — |
| $G_{IC}$ (J/m$^2$) | — | 370 | 410 | 440 | 420 | 460 | 430 |
| content per total epoxy resin in resin composition (mass %) | | | | | | | |
| A' (mass %) | 100 | 0 | 0 | 30 | 0 | 0 | 0 |
| B' (mass %) | 0 | 100 | 70 | 0 | 60 | 60 | 60 |

TABLE 7

| | Comparative example 16 | Comparative example 17 | Comparative example 18 | Comparative example 19 | Comparative example 20 | Comparative example 21 | Comparative example 22 |
|---|---|---|---|---|---|---|---|
| epoxy resin (epoxy resin [A']) | | | | | | | |
| N,N-diglycidyl-4-phenoxy aniline | | | | | | 40 | |
| Ex-731 | | 2 | 2 | 30 | 10 | | 30 |
| OPP-G | | | | | | | |
| N-glycidyl carbazole (epoxy resin [B']) | | | | | | | |
| ELM434 | 100 | 98 | 60 | 30 | 90 | 60 | 70 |
| jER630 | | | | | | | |
| (epoxy resin other than [A'] and [B']) | | | | | | | |
| EPON825 | | | | 38 | 40 | | |
| GOT | | | | | | | |
| GAN | | | | | | | |
| Ex-146 | | | | | | | |
| Elastomer component [D'] | | | | | | | |
| block copolymer M22N | | | | | | | |
| block copolymer SM4032XM10 | | | | | | | |
| core shell rubber particles MX416 | 6 | 6 | 6 | 6 | 6 | | |
| thermoplastic resin particles [E'] | | | | | | | |
| Toraypearl TN | 20 | 20 | 20 | 20 | 20 | 20 | 20 |
| thermoplastic resin [F'] | | | | | | | |
| Sumikaexcel PES5003P | | | | | | 12 | 10 |
| curing agent [C'] | | | | | | | |
| Seikacure-S | 45 | 40 | 40 | 34 | 45 | 45 | 40 |
| 3,3'-DAS | | | | | | | |
| characteristics of cured resin | | | | | | | |
| bending elastic modulus (MPa) | 3.3 | 3.3 | 3.2 | 3.5 | 3.5 | 3.8 | 3.7 |
| $K_{IC}$ (MPa · m$^{0.5}$) | 0.8 | 0.8 | 0.9 | 0.8 | 0.8 | 0.7 | 0.7 |
| characteristics of prepreg and fiber reinforced composite material | | | | | | | |
| glass transition temperature (° C.) | 265 | 255 | 192 | 157 | 229 | 193 | 184 |
| volatile matter (wt %) | 0.3 | 0.5 | 0.4 | 3.0 | 0.5 | 0.8 | 2.5 |
| tensile strength (MPa) | 2240 | 2360 | 2400 | 2790 | 2590 | 3080 | 3050 |

TABLE 7-continued

| | Comparative example 16 | Comparative example 17 | Comparative example 18 | Comparative example 19 | Comparative example 20 | Comparative example 21 | Comparative example 22 |
|---|---|---|---|---|---|---|---|
| compression strength after impact (MPa) | 375 | 375 | 367 | 327 | 374 | 357 | 347 |
| proportion of particles in 20% depth range (%) | 97 | 98 | 97 | 98 | 97 | 98 | 97 |
| $G_{IC}$ (J/m$^2$) | 490 | 510 | 520 | 480 | 470 | 450 | 430 |
| content per total epoxy resin in resin composition (mass %) | | | | | | | |
| A' (mass %) | 0 | 2 | 2 | 30 | 10 | 40 | 30 |
| B' (mass %) | 100 | 98 | 60 | 30 | 90 | 60 | 70 |

A cross-comparison of Working Examples 13 to 33 and Comparative Examples 9 to 22 has shown that prepregs based on the epoxy resin composition of the present invention are low in volatile content and that fiber-reinforced composite materials based on the epoxy resin composition of the present invention have high heat resistance and high strength characteristic under low temperature conditions, high impact resistance, and excellent mode-I interlaminar toughness.

A cross-comparison of Working Examples 13 to 33 and Comparative Examples 9 to 20 has shown that, even if component [D'] is contained, satisfactory mode-I interlaminar toughness cannot be obtained unless components [A'] and [B'] are also contained by prescribed amounts.

A cross-comparison of Working Examples 23 and 32 and Comparative Examples 21 and 22 has shown that, even if components [A'] and [B'] are contained by prescribed amounts, satisfactory mode-I interlaminar toughness cannot be obtained unless component [D'] is also contained.

INDUSTRIAL APPLICABILITY

The present invention makes it possible to obtain fiber-reinforced composite materials with excellent heat resistance and strength characteristics, as well as epoxy resin compositions and prepregs that form their basis. Moreover, fiber-reinforced composite materials based on such epoxy resin compositions are highly reliable because of the stability of their characteristics regardless of molding conditions, and are particularly advantageously used as structural materials. In this manner, the present invention enhances the high performance and lightweight characteristics of fiber-reinforced composite materials, as well as improving their processability. This, in turn, improves the degree of freedom in terms of the choice of material constitution and shape, giving rise to hopes for their contribution to the replacement of metals and other existing materials with fiber-reinforced composite materials in various fields. The present invention also provides epoxy resin compositions with little volatile content and high post-curing heat resistance. Moreover, fiber-reinforced composite materials derived from such epoxy resin compositions are particularly advantageously used as structural materials because of their excellent mechanical strength in low temperature and other tough use environments. Suitable aerospace applications include aircraft primary structural materials, such as main wings, tail units and floor beams, and secondary structural materials, such as flaps, ailerons, cowlings, fairings and interior materials, as well as rocket motor cases and satellite structural materials. Suitable general industrial applications include structural materials for vehicles, such as automobiles, marine vessels and railway trains, drive shafts, flat springs, windmill blades, pressure vessels, flywheels, papermaking rollers, roofing materials, cables, reinforcing bars, repair/reinforcement materials, and other architectural or civil engineering materials. Suitable sports applications include golf shafts, fishing rods, tennis, badminton or squash rackets, hockey sticks, and ski poles.

The invention claimed is:

1. An epoxy resin composition for fiber-reinforced composite materials comprising:
    [A] a glycidyl amino groups-containing epoxy resin component which comprises a polyfunctional glycidyl amino groups-containing epoxy resin and a difunctional glycidyl amino groups-containing epoxy resin;
    [B] an aromatic amine curing agent;
    [C] a block copolymer having a reactive group capable of reacting with a glycidyl group-containing resin, wherein the reactive group is selected from a carboxyl group and an oxirane group; and
    one or more optional epoxy resins, other than [A];
    wherein [A] accounts for 80 to 100 parts by weight of 100 parts by weight of total epoxy resin content; and
    wherein [C] is present in an amount of 2 to 15 parts by weight per 100 parts by weight of total epoxy resin content.

2. The epoxy resin composition for fiber-reinforced composite materials as described in claim 1, wherein the reactive group capable of reacting with a glycidyl group-containing resin that is contained in block copolymer [C] is a carboxyl group.

3. The epoxy resin composition for fiber-reinforced composite materials as described in claim 2, wherein block copolymer [C] having a reactive group capable of reacting with an epoxy resin is at least one block copolymer chosen from the group consisting of S-B-M, B-M and M-B-M, each of the blocks being connected to another by means of a covalent bond or an intermediate molecule connected to one of the blocks via a covalent bond and to the other block via another covalent bond, block M comprising a copolymer containing at least 50 mass % of a homopolymer of polymethyl methacrylate or methyl methacrylate and also comprising a reactive monomer as a copolymerization component, block B being incompatible with block M and having a glass transition temperature of 20° C. or less, and block S being incompatible with blocks B and M and having a glass transition temperature higher than that of block B.

4. The epoxy resin composition for fiber-reinforced composite materials as described in claim 1, wherein the polyfunctional glycidyl amino groups-containing epoxy resin accounts for 30 to 70 parts by weight of 100 parts by weight of total epoxy resin content; and the difunctional glycidyl amino groups-containing epoxy resin accounts for 20 to 50 parts by weight of 100 parts by weight of total epoxy resin content; provided that said polyfunctional and difunctional glycidyl amino groups-containing epoxy resins together account for 80 to 100 parts by weight of 100 parts by weight of total epoxy resin content.

5. The epoxy resin composition for fiber-reinforced composite materials as described in claim 1 wherein aromatic amine curing agent [B] is diaminodiphenyl sulfone or a derivative or isomer thereof.

6. The epoxy resin composition for fiber-reinforced composite materials as described in claim 1 having a complex viscosity at 80° C. in the range of 0.1 to 200 Pa*s.

7. A hardened epoxy resin material for fiber-reinforced composite materials obtained by curing the epoxy resin composition for fiber-reinforced composite materials as described in claim 1 and having phase separation structures with a size in the range of 0.01 to 5 μm.

8. A fiber-reinforced composite material comprising the hardened epoxy resin material as described in claim 7 and reinforcement fiber.

9. A prepreg obtained by impregnating reinforcement fiber with the epoxy resin composition for fiber-reinforced composite materials as described in claim 1.

10. A prepreg as described in claim 9 wherein the reinforcement fiber is carbon fiber.

11. A fiber-reinforced composite material obtained by curing the prepreg as described in claim 9.

12. A fiber-reinforced composite material as described in claim 11 wherein the reinforcement fiber is carbon fiber.

* * * * *